United States Patent [19]
Hayashida

[11] Patent Number: 6,003,762
[45] Date of Patent: Dec. 21, 1999

[54] TRANSACTION TERMINAL FOR AN ELECTRONIC CASHLESS SYSTEM

[75] Inventor: Shoji Hayashida, Higashi-kurume, Japan

[73] Assignee: Fujitsu Limited, Kawasaki, Japan

[21] Appl. No.: 08/279,856

[22] Filed: Jul. 26, 1994

Related U.S. Application Data

[63] Continuation of application No. 07/959,458, Oct. 9, 1992, abandoned, which is a continuation of application No. 07/578,234, Sep. 6, 1990, abandoned.

[30] Foreign Application Priority Data

Sep. 6, 1989 [JP] Japan ................................ 1-230893

[51] Int. Cl.$^6$ .................................................. G06R 17/60
[52] U.S. Cl. ............................................ 235/379; 235/380
[58] Field of Search ............................. 235/379, 380

[56] References Cited

U.S. PATENT DOCUMENTS

| | | | |
|---|---|---|---|
| 3,501,622 | 3/1970 | Weir et al. | 235/384 |
| 3,609,300 | 9/1971 | Halpern | 235/384 |
| 3,852,571 | 12/1974 | Hall et al. . | |
| 3,870,866 | 3/1975 | Halpern | 235/384 |
| 3,956,615 | 5/1976 | Anderson et al. | 235/379 |
| 3,958,103 | 5/1976 | Oka et al. | 235/384 |
| 4,295,039 | 10/1981 | Stuckert | 235/379 |
| 4,303,904 | 12/1981 | Chasek | 235/384 |
| 4,305,059 | 12/1981 | Benton . | |
| 4,454,414 | 6/1984 | Benton . | |
| 4,501,958 | 2/1985 | Glize et al. | 235/384 |
| 4,614,861 | 9/1986 | Pavlou | 235/379 |
| 4,630,201 | 12/1986 | White | 364/408 |
| 4,717,815 | 1/1988 | Tomer | 235/384 |
| 4,727,243 | 2/1988 | Savar | 235/380 |
| 4,752,676 | 6/1988 | Leonard et al. | 235/379 |
| 4,795,892 | 1/1989 | Gilmore et al. . | |
| 4,839,504 | 6/1989 | Nakano . | |
| 4,859,837 | 8/1989 | Halpern | 235/380 |
| 4,870,259 | 9/1989 | Boggian et al. | 235/380 |
| 4,877,947 | 10/1989 | Mori | 235/379 |
| 4,900,905 | 2/1990 | Pusic | 235/375 |
| 4,926,325 | 5/1990 | Benton et al. | 364/408 |
| 4,926,996 | 5/1990 | Eglise et al. | 235/381 |
| 4,961,142 | 10/1990 | Elliott et al. | 902/26 |

(List continued on next page.)

FOREIGN PATENT DOCUMENTS

| | | |
|---|---|---|
| 0363122 | 4/1990 | European Pat. Off. . |
| 97118508 | 10/1998 | European Pat. Off. . |
| WO83/03018 | 9/1983 | WIPO . |
| WO 83/03694 | 10/1983 | WIPO . |

OTHER PUBLICATIONS

Masuo Tamada et al., "IC Card System", 1987, pp. 30–33, Tokyo, Japan.

Lemont Southworth, "Basics of EFT Network Switching", 1983, pp. 175–186, New York, U.S.A.

The Society for the Study of the Commercialization of IC Cards, "A Report by the Society for the Study of the Commercialization of IC Cards", Dec. 1987.

P. Rémery et al. "Le paiement électronique" L'Echo des Recherches, No. 134, 1988.

Carol H. Fancher, "Smart Cards", *Scientific American*, Aug. 1996, pp. 40–45.

*Primary Examiner*—Harold I. Pitts
*Attorney, Agent, or Firm*—Staas & Halsey LLP

[57] ABSTRACT

An electronic cashless system uses a cashless medium for memorizing amount information and for performing an operation of amount information. The electronic cashless system comprises an automatic transaction terminal device having a reading/writing unit for writing amount information to the cashless medium, and a center device having a unit for identifying the account balance of multiple accounts and for storing amount information and a non-settled fund file unit for storing amount information written by the cashless medium and a seller ledger file means for identifying the account balance of the multiple seller's accounts and for storing amount information.

17 Claims, 20 Drawing Sheets

U.S. PATENT DOCUMENTS

| | | | |
|---|---|---|---|
| 4,968,873 | 11/1990 | Dethloff | 235/380 |
| 5,003,520 | 3/1991 | Grieu et al. | 235/380 |
| 5,010,485 | 4/1991 | Bigari | 235/379 |
| 5,012,076 | 4/1991 | Yoshida | 235/379 |
| 5,015,274 | 5/1991 | Micali et al. | |
| 5,016,274 | 5/1991 | Micali | 235/379 |
| 5,023,436 | 6/1991 | Takada | 235/379 |
| 5,051,564 | 9/1991 | Schmidt | 364/464.02 |
| 5,093,787 | 3/1992 | Simmons | 235/379 |
| 5,122,643 | 6/1992 | Gamou et al. | 235/384 |
| 5,147,021 | 9/1992 | Maruyama | 235/318 |
| 5,453,601 | 9/1995 | Rosen | |
| 5,644,118 | 7/1997 | Hayashida | |

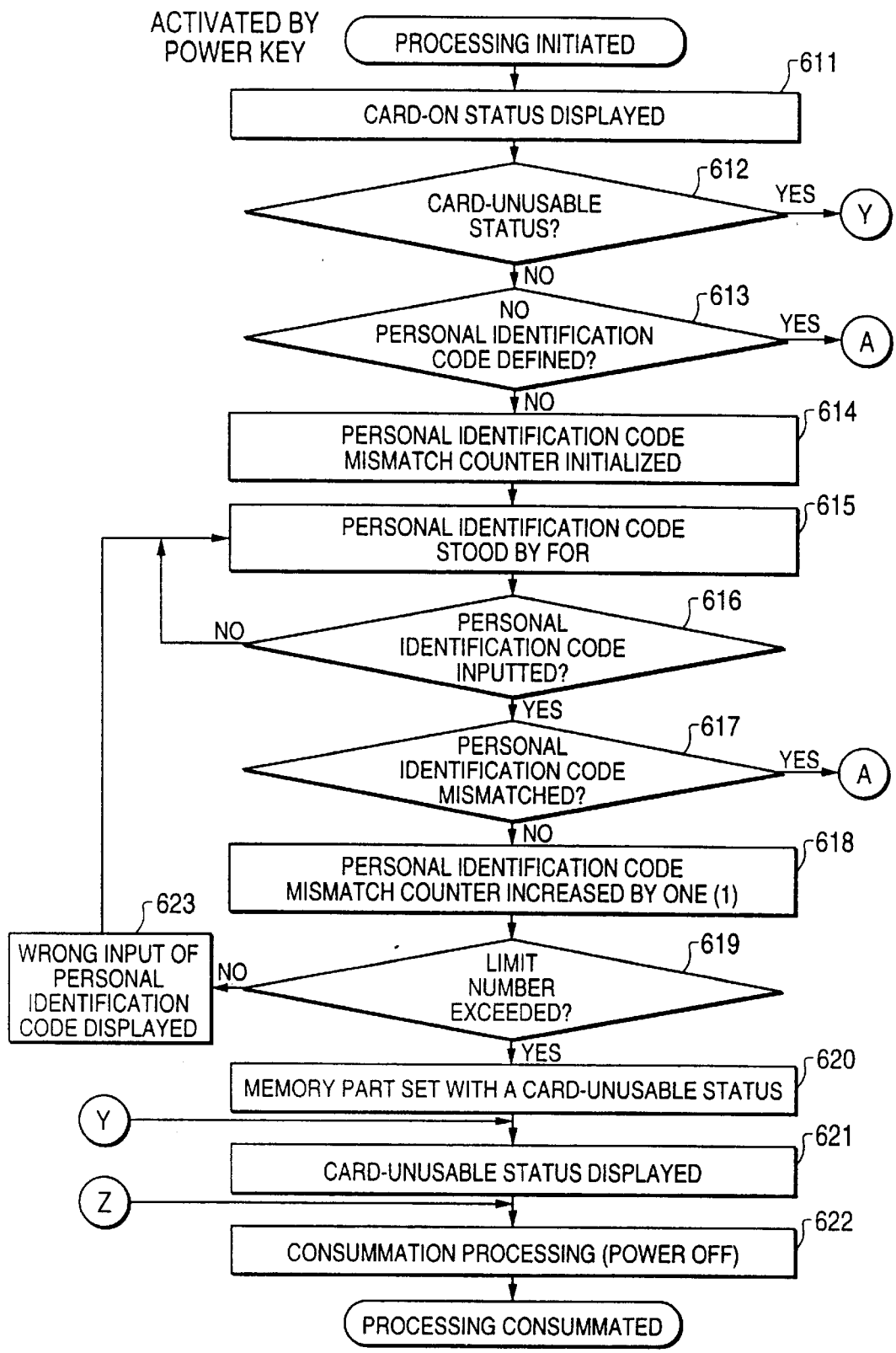

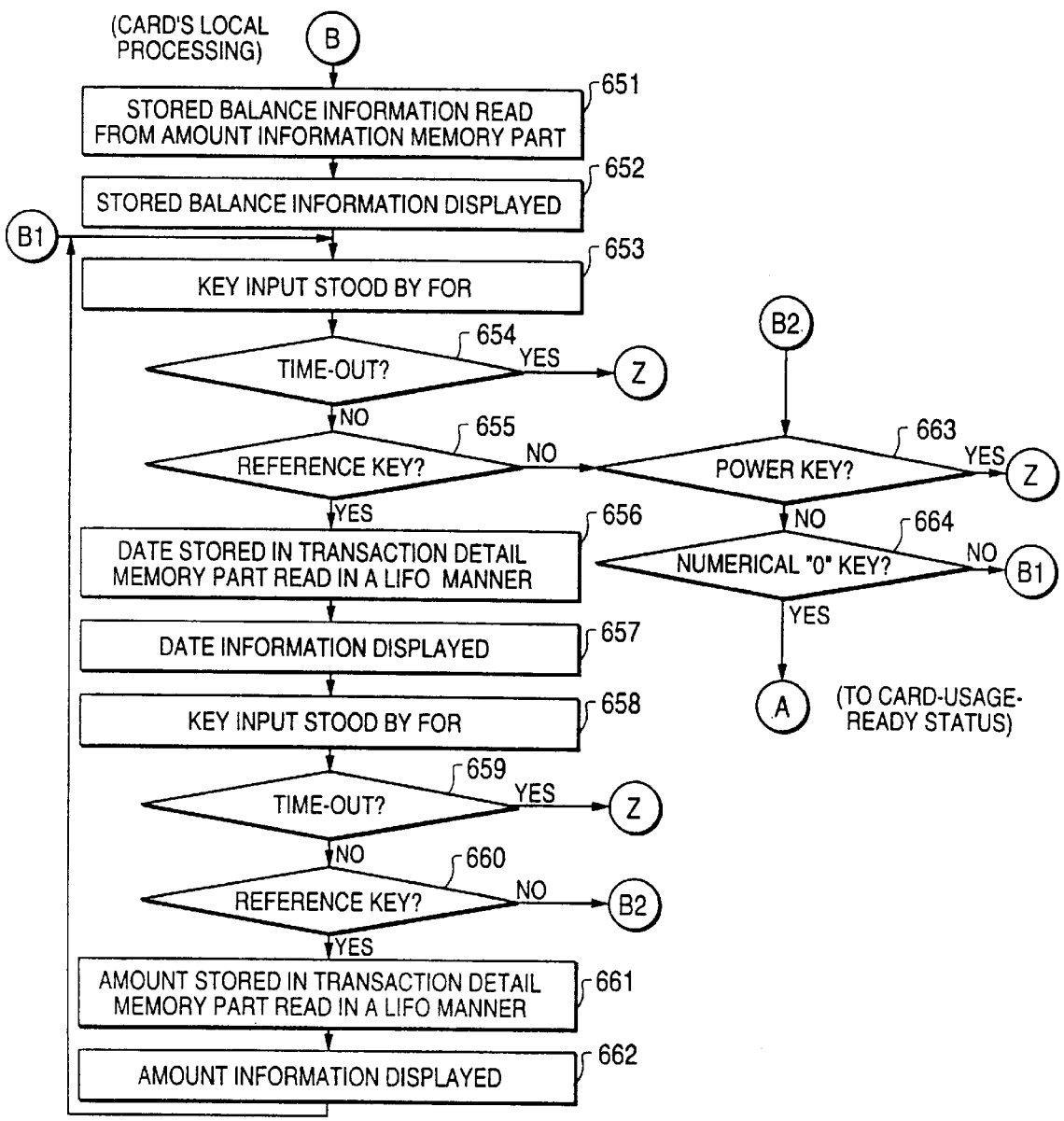

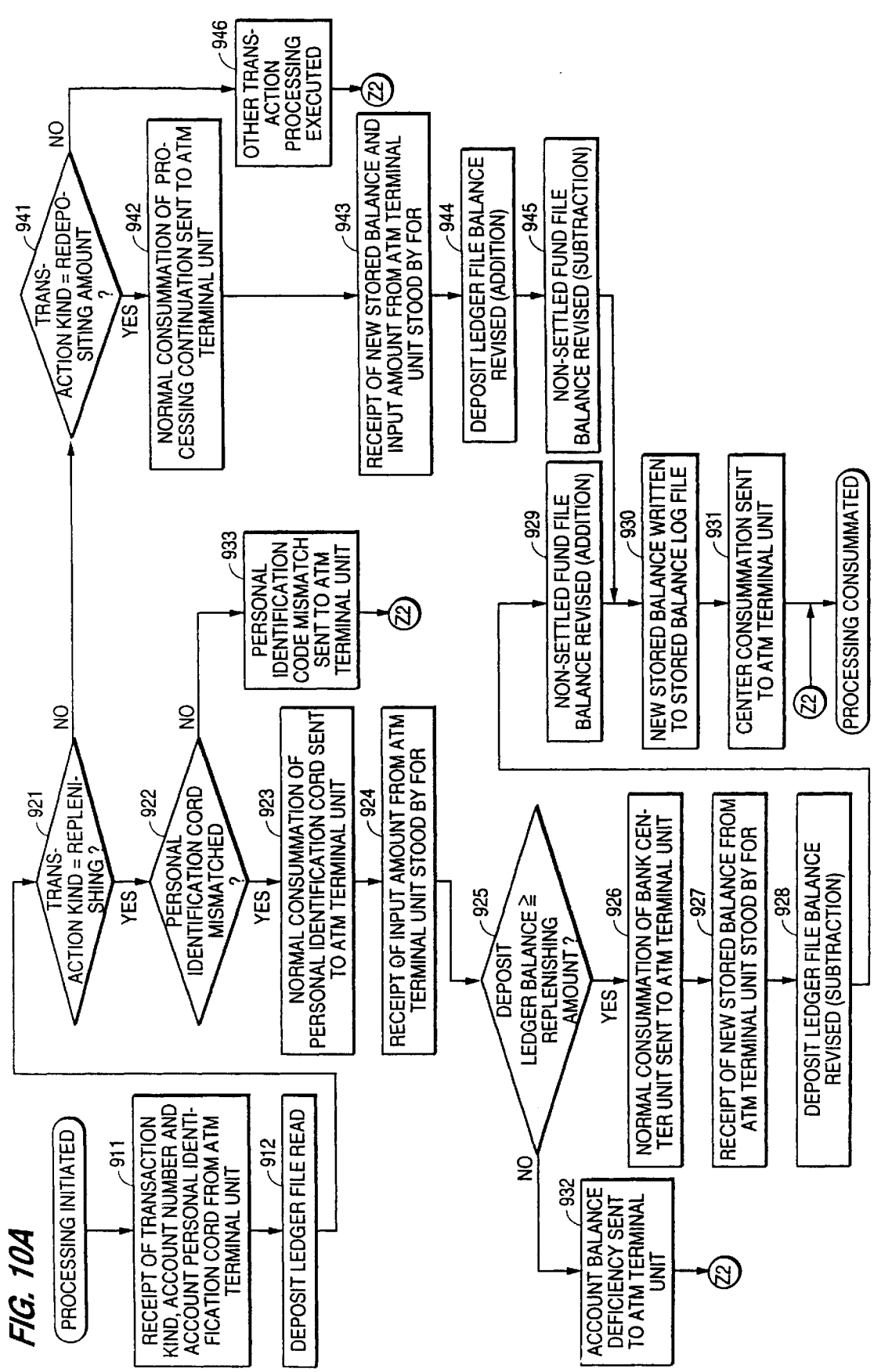

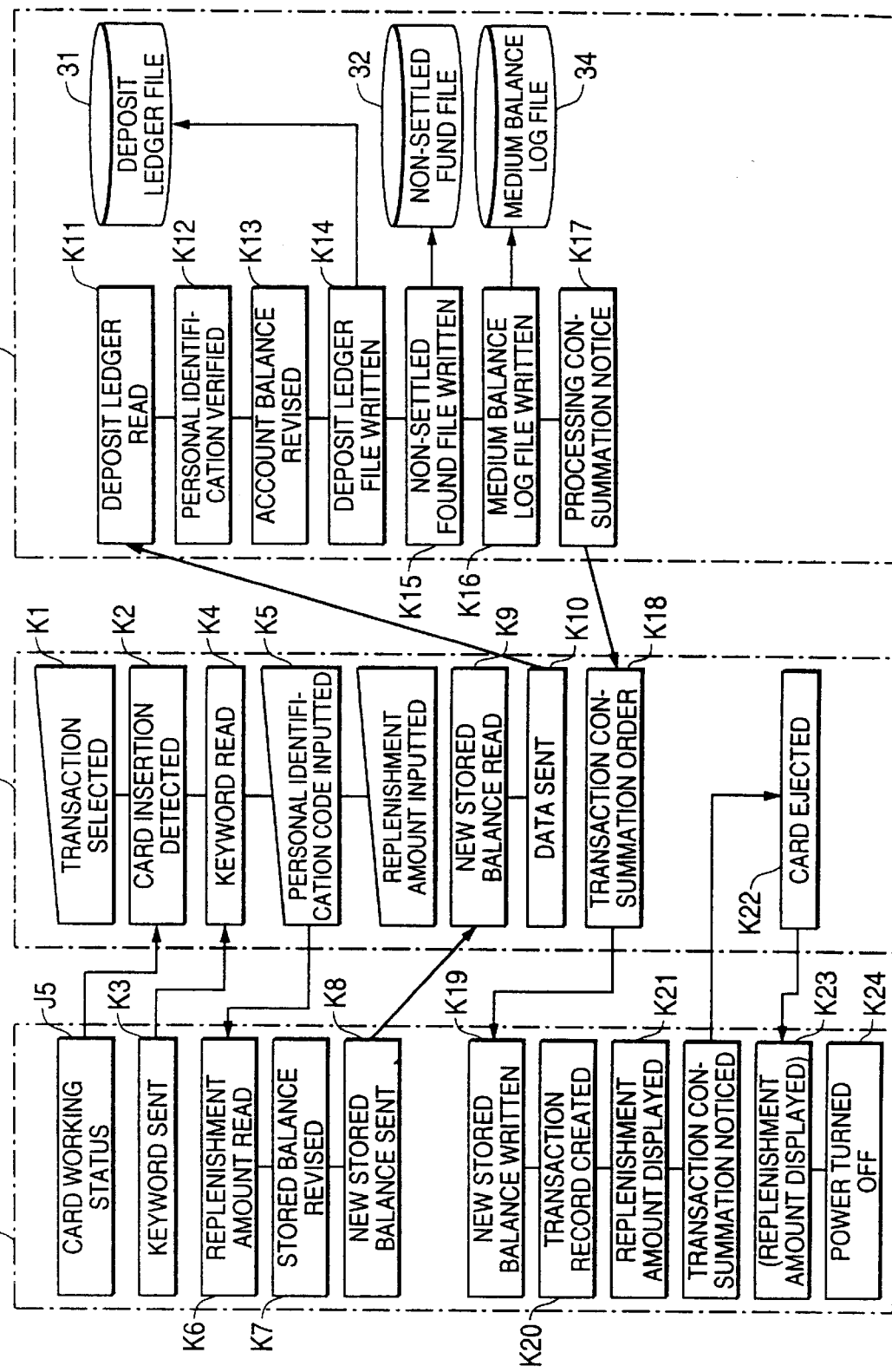

TRANSACTION TERMINAL FOR AN ELECTRONIC CASHLESS SYSTEM

This application is a continuation of application Ser. No. 07/959,458, filed Oct. 9, 1992, now abandoned which application is a continuation of application Ser. No. 07/578,234, filed Sep. 6, 1990, now abandoned.

BACKGROUND OF THE INVENTION

This invention relates to an electronic cashless system for cashless commercial transactions.

The following three transaction forms are mainly used to enable cashless commercial transactions.

(1) A Transaction With a Credit Card

When the customer makes a purchase, he shows a credit card issued by a bank for payment to a seller. Normally, the seller asks the issuer for an authorization to accept the credit card. If the acceptance is authorized, the purchase transaction with the credit card is executed. The seller then asks the credit card company for payment. The credit card company has banks related to the commercial transaction prepaid the sales amount from the customer's account and credit it to the seller's account.

(2) A Transaction With a Bank ATM Card

When the customer makes a purchase, he shows the seller a bank ATM (automatic teller machine) card intended for depositing and withdrawing cash from an ATM. The seller asks the customer's bank for payment through a POS terminal that can directly log onto the bank's deposit ledger files at the point of sale. The bank immediately transfers the amount from the customer's account to the seller's account.

(3) A Transaction With a Prepaid Card

The customer makes a prior cash purchase of a prepaid card from a seller or an automatic vending machine. After the customer inserts the prepaid card into the automatic vending machine and follows the necessary instructions, goods or services are provided and the appropriate amount is deducted from the prepaid card.

These three methods each have their disadvantages as follows.

(1) A Transaction With a Credit Card

A. The seller has to ask the issuer for an authorization to accept the credit card and is required to do additional paperwork for creating invoices. Therefore, the use of credit cards is limited to purchases at retail outlets of higher priced goods and higher value-added goods.

B. To avoid a doubtful account or a situation, where not sufficient funds were deposited at the time of purchase, a credit card is issued only to the customers who pass a certain test.

(2) A Transaction With a Bank ATM Card

A. The transfer of the amount from the customer's account to the seller's account must be made immediately after the execution of a transaction. Therefore, this requires an extraordinary processing during the bank's non-business hours, which is different from an ordinary processing during the bank's business hours. It also requires a work related burden for the seller and an account balance control burden for the customer.

B. Since the amount is transferred each time a purchase is made, the workload and expense are large.

(3) A Transaction With a Prepaid Card

A. A prepaid or debit card is like a prepaid single use ticket. Thus, a one-time-only customer who does not buy the same kinds of products or and on the same shop repeatedly would not use such a card.

B. If a customer is asked to buy a prepaid card far in advance of his planned purchase of necessary goods and services, his current liquidity is reduced.

C. Since cash is required to buy a prepaid card anyway, it is not a true cashless commercial transaction.

Thus, although they have their particular applications, these cashless transaction methods do not constitute an almighty shopping means for everyone.

SUMMARY OF THE INVENTION

An object of the present invention is to provide completely cashless commercial transactions.

A feature of the present invention resides in an electronic cashless system comprising a cashless medium or electronic money for memorizing amount information and for performing an operation of amount information, an automatic transaction terminal device having a reading/writing means for writing amount information to the cashless medium, a center device having a deposit ledger file, connected with the automatic transaction terminal device, means for identifying the account balance of multiple accounts and for storing amount information and at least a non-settled fund file means for storing amount information written by the cashless medium and a seller ledger file means for identifying the account balance of the multiple seller's accounts and for storing amount information.

BRIEF DESCRIPTION OF THE DRAWINGS

FIGS. 7A through 7D show the processing flow for a multi-function IC card, FIGS. 10A and 10B show the processing flow of a bank center unit, FIG. 11 shows the amount replenishment flow to a card.

DESCRIPTION OF THE PREFERRED EMBODIMENTS

Following is a detailed explanation of this invention.

Figure 1:
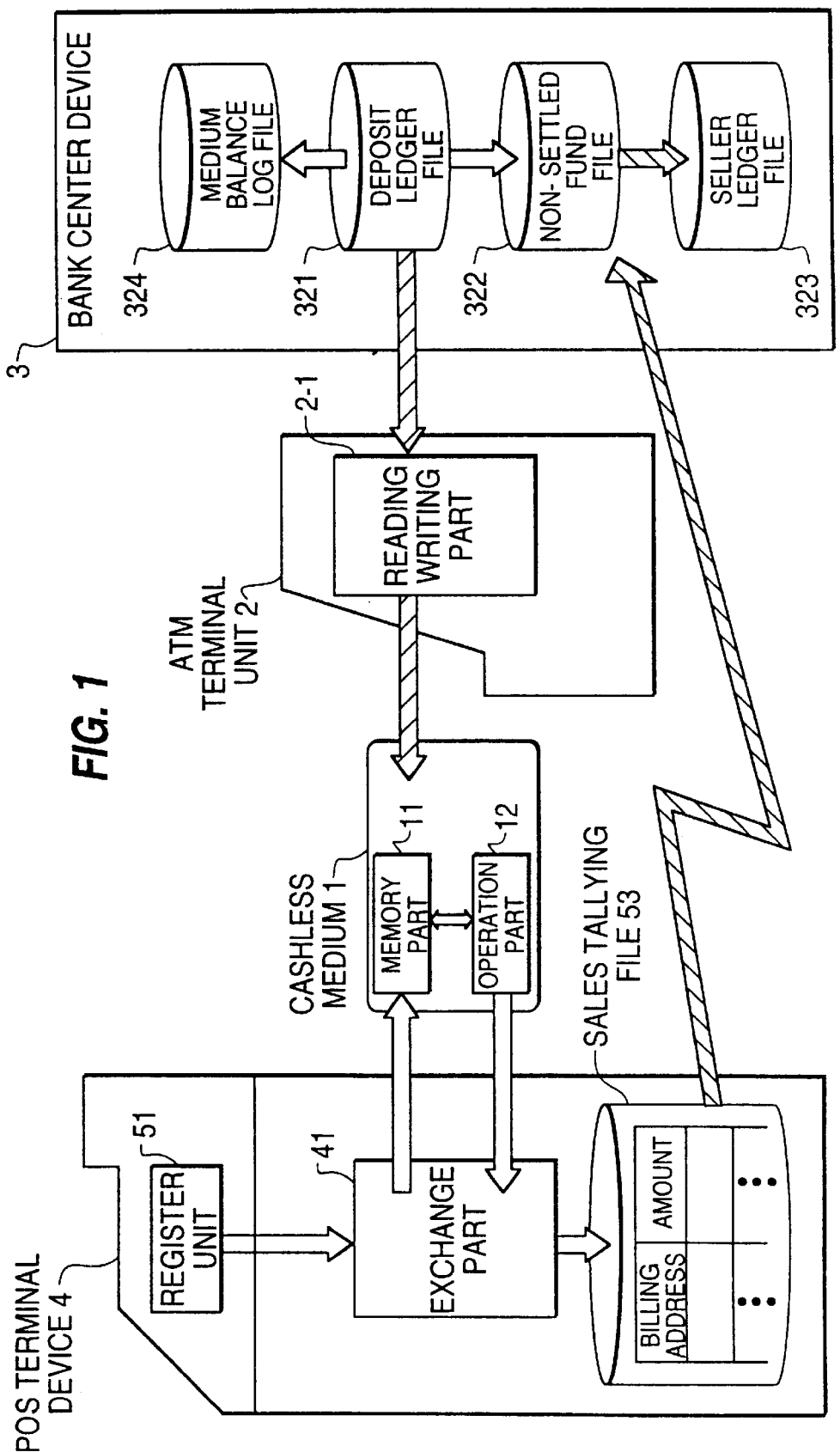
FIG. 1 shows the configuration of the underlying principle.

FIG. 1 shows the configuration of the underlying principle. This configuration comprises a cashless medium 1 having memory means 11 for memorizing amount information, and an operation means 12; an ATM terminal unit 2 having a read/write means 2-1 for writing amount information into the cashless medium 1; a deposit ledger file 321 for storing amount information that identifies the deposit balance corresponding to one of many accounts; a non-settled fund file 322 for storing amount information written at least in the cashless medium 1; a bank center device 3 comprising a seller ledger file 323 for storing amount information that identifies the deposit balance corresponding to the account of the seller and a medium balance log file 324 for memorizing balance of the cashless medium 1 when the ATM terminal unit 2 writes the most recent amount information to the cashless medium 1; and a commercial transaction or POS terminal device 4 having a register unit 51 to which amount information is input, a sending/receiving part 41 for at least sending and receiving amount information to and from said cashless medium 1, and a sales tallying file 53 for tallying and storing amount information gained from said cashless medium 1, and that is at least connected with the bank center device 3.

Below is an explanation of an operative input and an action in the configuration of FIG. 1.

The ATM terminal unit 2, at an issuing time of the cashless medium 1, writes into the memory part 11 any designated amount information not exceeding the upper limit of the amount information stored in the deposit ledger file 321 of the bank center device 3. The owner of the cashless medium 1 carries it with him to a seller. The owner presents this cashless medium 1 at a clearing time. An operator at a retail outlet operates the register unit 51 of the commercial transaction or POS terminal device 4 and inputs amount information necessary to clear the commercial transaction. The sending/receiving part 41 of the commercial transaction or POS terminal device 4 sends inputted amount information necessary to clear the commercial i.e. the amount of goods and services changing hands. The operation means 12 of the cashless medium 1 makes an operation processing based on the amount information received from the commercial transaction or POS terminal device 4 and the amount information memorized in the memory means 11. In short, the operation means 12 performs the an operation of subtracting the amount indicated by the amount information received from the commercial transaction or POS terminal device 4 from the amount indicated by the amount information stored in the memory means 11. After this operation, if amount information in excess of the amount necessary for clearing the commercial transaction is stored in the memory means 11 of the cashless medium 1, the cashless medium 1 notifies such an occurrence to the commercial transaction or POS terminal device 4. After this notification, the commercial transaction or POS terminal device 4 sends the information that the commercial transaction has taken place to the cashless medium 1 and stores the same amount information in the sales tallying file 53 classified by the clearing bank. These actions conclude a direct clearing of the commercial transaction with the owner of the cashless medium 1.

Next, an indirect clearing of the commercial transaction is made, i.e. a clearing with the bank center device 3. First, amount information stored in the sales tallying file 53 is sent to the bank center device 3 of the proper clearing bank. Based on the amount information sent, the bank center device 3 prepaids the necessary amount to the non-settled fund file 322 and credits the same to the appropriate account of the seller in the seller ledger file 323.

Since a transaction is thus consummated in the above manner. This invention thus enables a complete cashless commercial transaction.

Meanwhile, when amount information memorized in the memory means 11 of the cashless medium 1 is rewritten, the cashless medium 1 is confirmed of its validity first by being connected to the ATM terminal unit 2. This could be done, for instance, by a password. After amount information inputted by the owner, such as that pertaining to the increase in the authorized amount, is sent to the bank center device 3, the bank center device 3 reads out information from the deposit ledger file 321 of the cashless medium 1 and stores the information in the deposit ledger file 321 after revising it. It also settles the non-settled funds stored in the non-settled fund file 322 and stores the balance in the medium balance log file 324. After this storing operation, the bank center device 3 sends a termination notice to the ATM terminal unit 2, which updates the balance memorized by the memory means 11 of the cashless medium 1 so that a new balance is certain (usable). This revision can be done by the inputted amount immediately after the validity of the cashless medium 1 is confirmed and fixed after the termination notice from bank center device 3. The above actions enable a complete cashless commercial transaction by making the clearing cashless and by deducting the amount at settlement time.

Figure 2A:
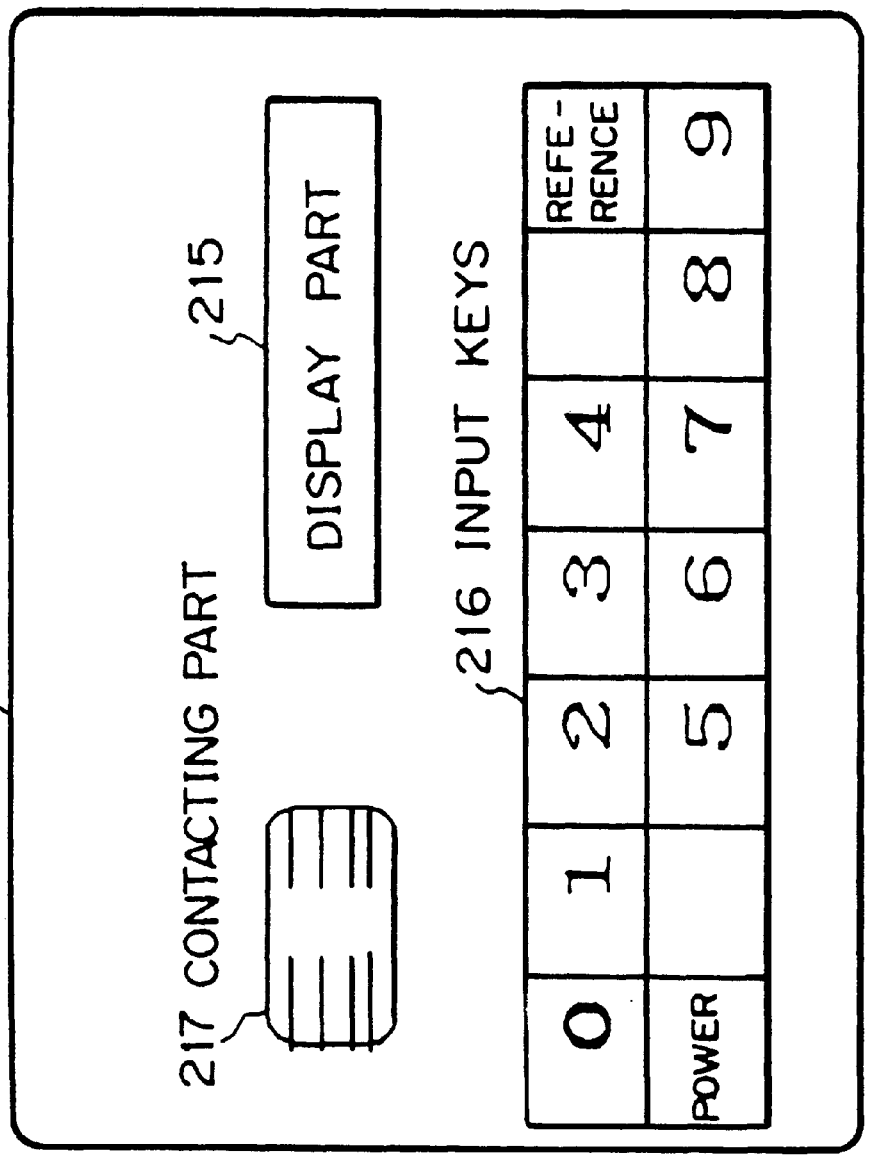
FIGS. 2A and 2B show the preferred embodiment of the cashless medium.
Figure 2B:
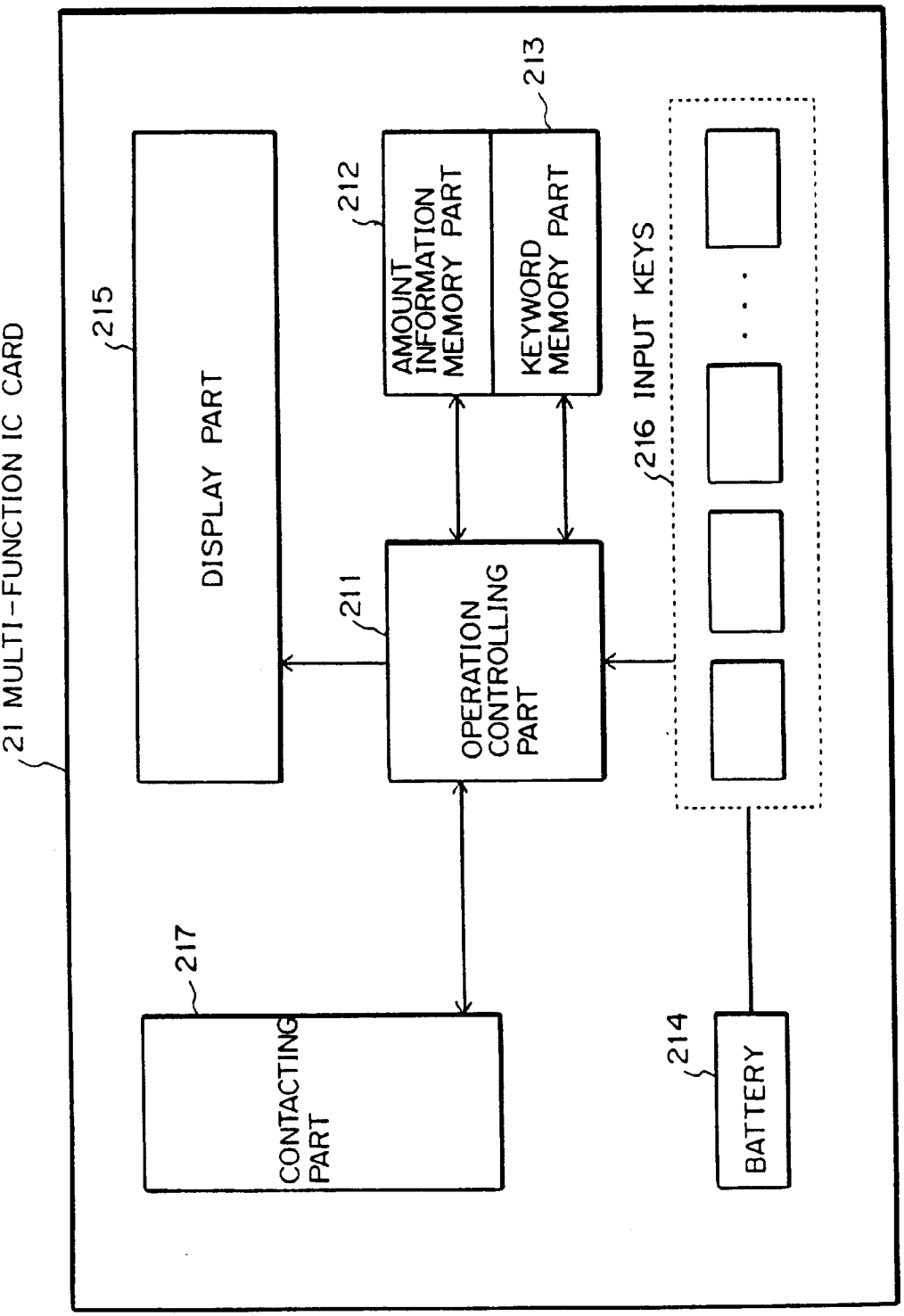

The following is the description of each device.
(1) Cashless Medium (Refer to FIG. 2.)

It is a substitute for an existing bank ATM card (magnetic stripe card). Its functions are technologically extended and its purpose is expanded. It is a multi-function IC card containing an electronic brain (a memory part and an operation and processing part).

The multi-function IC card 21, a cashless medium, contains an operation control part 211, an amount information memory part 212, a keyword memory part 213 and a battery 214, and has display part 215 (for instance a liquid crystal display), input keys 216 (a function key and a numeric key) and a contact part 217 (an interface with an ATM terminal unit) on its an external surface.

Next, the actions of the cashless medium are explained by referring to FIGS. 7A through 7D.

First, a customer who wants to make an electronic cashless commercial transaction must have amount information for a shopping process written on a multi-function IC card 21, appropriately issued by a valid issuer. This amount in the amount information can be designated arbitrarily as any amount not exceeding the limit set between the customer and the issuer of the multi-function IC card as cashless medium 1.

The amount information needs to be memorized in the amount information memory part 212 of the multi-function IC card 21. If the customer knows the balance in the amount information memory party 212 of the multi-function IC card 21 , he can make an appropriate replenishing action as to how much amount is necessary to be replenished.

The customer turns on the power of the multi-function IC card 21 with its input keys 216. When the power of the multi-function IC card 21 is turned on, as shown in FIG. 7A, the multi-function IC card 21 indicates a "power-on" status at the display part 215, for example by showing a numeric digit "0" by a setting of a "power-on" status (step 611). At this time, if the card is already unusable, an unusable status is detected by a card usage failure status determination (step 621). The multi-function IC card 21 notifies the owner that the card is unusable by indicating an "X" sign at a sign digit of the card's display part 215, for example, and turns off its own power through a termination processing (step 622).

When a card usage failure determination (step 621) judges "NO", i.e. the card being NOT unusable, the multi-function IC card 21 makes a validity check of the card use by a personal identification code individually registered by each owner (step 613). This personal identification code, which is registered when the card is issued, can be chosen to be unnecessary to suit the owner's convenience.

If the multi-function IC card 21 detects no registering of a personal identification code in any personal identification code determination (step 613), for counting the number of wrong personal identification code inputs by the owner, a personal identification code mismatch counter is initialized (cleared) to standby for a personal identification code input. Next, the multi-function IC card 21 becomes ready for an input of a personal identification code (step 615) by the owner. When the owner inputs his personal identification code with input keys 216, the multi-function IC card 21 detects the input through personal identification code determination (step 616), and a judgment is made as to whether an inputted personal identification code matches a registered personal identification code at step 617. If the former mismatches the latter, the value of the input counter of a personal identification code mismatch is increased by one, and whether or not the number of mismatches exceeds a limit is judged in step 619. If it does not, an indication of a personal identification code mismatch is given to the owner by a display part 215 in step 623, for instance with an indication of an "E" at a numeric digit, and the multi-function IC card 21 waits for a new input of a personal identification code in step 615. If the number of mismatches is judged to exceed the limit number by a limit judgment (step 619), the multi-function IC card 21 registers a card usage failure status in its internal memory part in step 620, for instance with an invalid card flag within the keyword memory part 213. After this status is registered, it becomes impossible for the owner to clear it. Next, multi-function IC card 21 notifies the owner, who is the card user, that the card is in a card usage failure status, e.g. by indicating an "X" sign in a code digit in display part 215. Thereafter, multi-function IC card 21 stops its own processing by turning off its power according to a termination processing (step 622). If the wrong personal identification code is inputted several times, the holder is not deemed to be the authorized owner of the multi-function IC card 21. Thus, once a limited number by which the personal identification code is input is exceeded, the card usage failure status is maintained, even if the power of the card is turned on. Thus, an unauthorized holder is prevented from abusing the card.

Figure 7B:
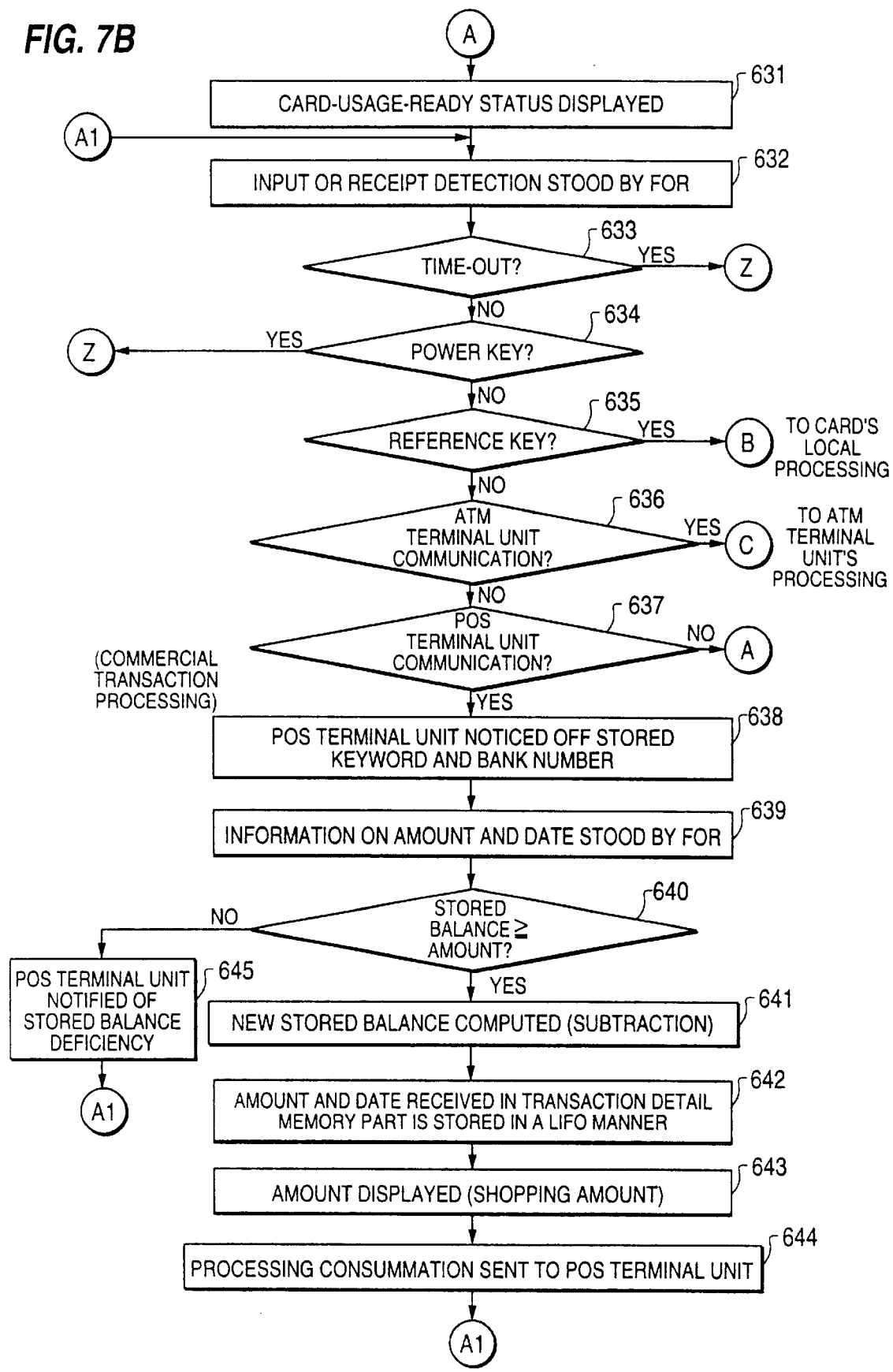

If the multi-function IC card 21 identifies a match (YES) of a personal identification code inputted by the holder and one memorized internally in step 617 or no personal identification code is registered (judged YES in step 63), the following processings are made. As shown in FIG. 7B (wherein [A], [B], [C], [Y], [Z], [A1], [B1] and [B2] are terminals that show the processing flow), by an indication processing of a card usage ready status (step 631) in display part 215, the multi-function IC card 21 notifies the owner that the card is in a usable state, for instance by showing a double circle in the code digit. The multi-function IC card 21 is thus put in an activated state and stands by for an input or a receipt detection (step 632). Thereafter, the owner of the card can confirm the card's remaining balance or check a detail of the prepaids and credits as a local card processing, shop at a retailing outlet, or increase or decrease the amount stored in the card by transferring funds respectively from or to the other deposit accounts with an ATM terminal unit. Next, to detect the arrival of these demands (step 633), the multi-function IC card 21 judges a time-over, a power key input, a confirmation key input, and a communication with an ATM terminal unit in steps 634, 635, 636 and 637 respectively.

When the card is left without further instruction after being put in a ready status, such a condition is detected (YES) by a time-over determination (step 633), and the card stops its actions after performing a termination process 622.

A power key set in the card's input keys 216 turns the card's power on and off. If an owner leaves the power on after making necessary processings by activating the card, the card's battery 214 is exhausted unnecessarily. To prevent such battery exhaustion, like an automatic power shut down function of an electronic calculator, the multi-function IC card 21 automatically turns its own power off, if time-over determination step 633 does not detect any input or communication over a certain period of time.

When an amount replenishment is made for multi-function IC card 21, multi-function IC card 21 detects (YES) that a communication with the ATM terminal unit 2 will be made, when the card is inserted into the ATM terminal unit 2 in step 636 and begins a communication with the ATM terminal unit 2 via a contact part 217 of the multi-function IC card 21.

Figure 7D:
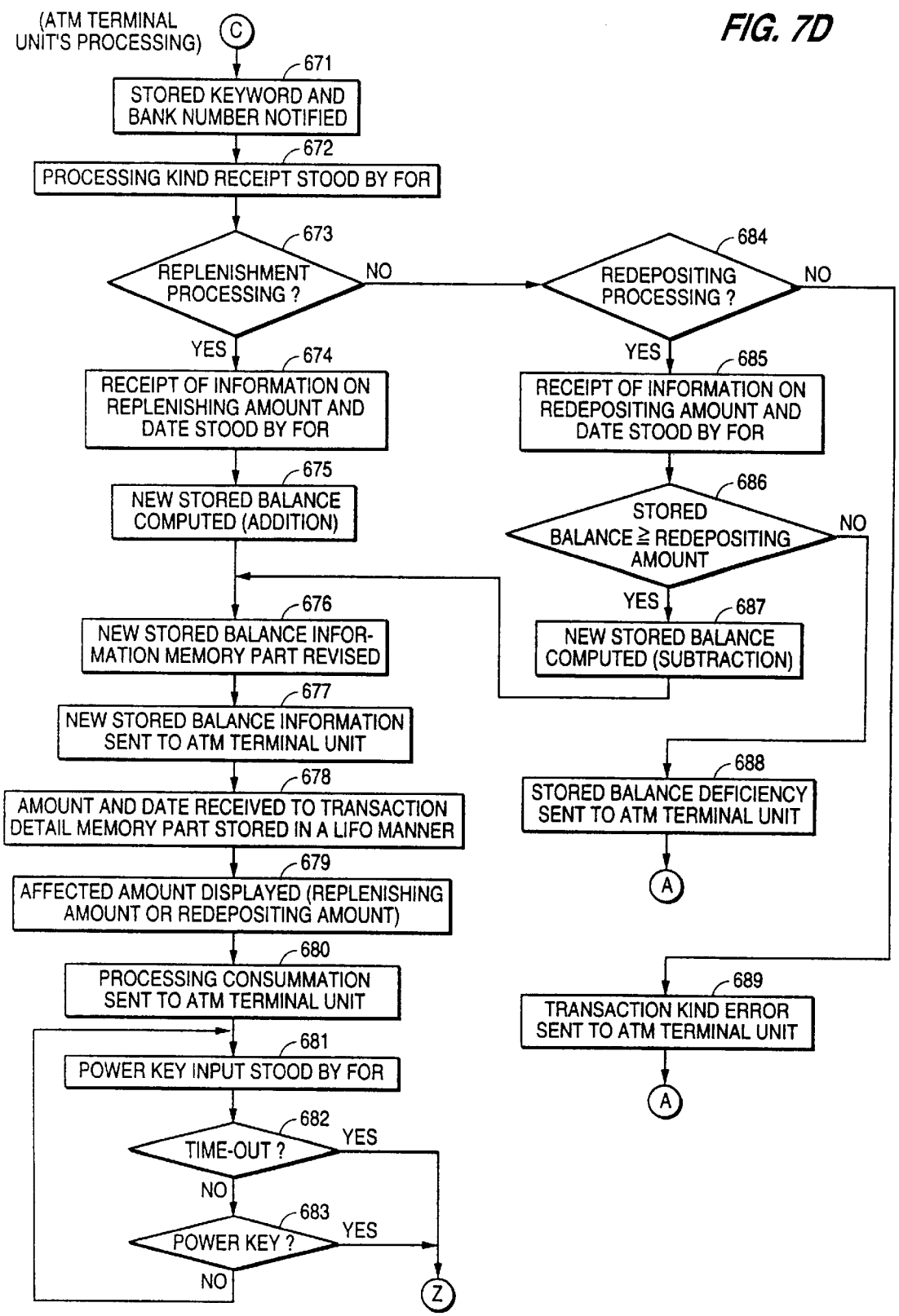

As shown in FIG. 7D, the multi-function IC card 21 first notifies the keyword and the bank number stored in its own keyword memory part 213 to ATM terminal unit 2 for mutual verification (step 671), and stands by for a processing kind. Inputting a replenishing amount, the owner operates ATM terminal unit 2 for transferring the amount from his deposit account to the multi-function IC card 21 in its amount information memory part 212. Then, the multi-function IC card 21 stands by to receive the processing kind (step 672) from the ATM terminal unit 2. If the processing kind is judged (YES) as a replenishment processing (step 673), the multi-function IC card 21 stands by to receive information about the replenishing amount and the replenishment date from ATM terminal unit 2 (step 674). After receiving the information, the replenishing amount contained in the information received from the ATM terminal unit 2 and the remaining balance memorized in the amount information memory part 212 within the card are added together to produce a new balance (step 675). This addition is executed in the operation control part 211. Then the information about the new balance is stored in the amount information memory part 212 within the card by a processing of revising amount information memory (step 676). Thus the replenishment of the amount specified by the owner from his bank account to amount information memory part 212 within the card is concluded. This new balance is sent to the ATM terminal unit 2 to be memorized by a center processing unit (step 677). Next, as a record for executing amount replenishment transactions, the replenishing amount and date are memorized in the transaction detail memory part of the multi-function IC card 21 (step 678). This memory is stored according to an LIFO (Last-In, First-Out) method, so that the owner can confirm transactions starting with the most recent one.

When all the revision processes by the operation control part 211 within the multi-function IC card 21 are finished, the replenishing amount is displayed on the display part 215 in replenishing amount display processing (step 679). Next, the information that the replenishment processing within the multi-function IC card 21 has finished is sent to the ATM terminal unit 2 (step 680), and multi-function IC card 21 stands by for an input to the power key (step 681). Then, the processings are finished with a time-over detection (YES) by a time-over detecting processing (step 682) or with a power off (YES) by power key detecting processing (step 683) of the input keys 216. The owner can verify the amount replenished at this time by looking at the amount shown on the display part 215 of the card just coming out from the ATM terminal unit 2.

Meanwhile, when the owner deposits at least a part of the card's balance to his deposit account, the multi-function IC card 21, after standing by to receive a processing from the ATM terminal unit 2, detects that it is not a replenishment processing (NO). Then, multi-function IC card 21 judges whether it is a depositing processing in a judgment processing (step 684). If the processing kind is undefined (NO), the multi-function IC card 21 notifies the ATM terminal unit of the transaction kind error (step 689) and reverts to displaying a card-usage-ready status (step 631). When the owner transfers a part of the amount stored in the multi-function IC card 21 back to the deposit account, the multi-function IC card 21 stands by to receive the information on the transferred amount and the transaction date from the ATM terminal unit 2 in the receiving-ready processing (step 685), and when the receipt of the information is consummated, a stored amount deficiency judgment processing (step 686) compares the transferred amount and the stored balance in the amount information memory part 212. If the redepositing amount is greater, a not-sufficient-fund judgment (NO) is made, and the ATM terminal unit 2 is notified of the not sufficient fund balance in step 688. Then, control is handed over to the card-usage-ready status display step 631, and the multi-function IC card 21 stands by for a subsequent input.

When the stored balance is greater than the redepositing amount, a redepositing processing becomes possible, and the balance of the stored amount is reduced by the redepositing amount in a reduction processing (step 687). Then, a processing similar to a balance information revising processing (step 676) of a replenishment processing is performed, so that the balance information memory in amount information memory part 212 is revised. That is, the ATM terminal unit 2 is notified of the new reduced balance to be memorized in a medium balance log file 34 of the bank center device 3. After the multi-function IC card 21 memorizes the redepositing amount and the transaction date in transaction detail memory processing (step 678), the display part 215 of the multi-function IC card 21 shows the redepositing amount with a negative sign, for instance, so that the owner can confirm the transferring amount by viewing the display part 215. Then, the multi-function IC card 21 notifies the ATM terminal unit 2 of the processing consummation in a sending processing (step 680), and stands by for a power key input starting from step 681 or a power-off instruction for an elapsed time over a predetermined period by a time-over judgment step. Because there is some time before the power is turned off, the owner can confirm the processing result of the transaction with the ATM terminal unit 2 by looking at the display part 215. Besides, even if the owner forgets to turn the power off, it is turned off automatically after a predetermined time has elapsed. Thus, the battery 214 is prevented from being exhausted unnecessarily and his privacy is protected by eliminating the possibility of the display part 215 being seen by others.

When the owner inquires about the stored balance, the date and amount of past purchases, the date and amount of a replenishment or a transfer back to his deposit account, the multi-function IC card 21 can display the balance and transaction details memorized in the amount information memory part 212 on the display part 215. In this case, after the owner puts the multi-function IC card 21 in a card-usage-ready status by activating the card, he operates the inquiry key of the input keys 216. The card is in an activated status and the multi-function IC card 21 detects this by an inquiry key detecting processing (step 635). The processing status of this inquiry key becomes a card's local processing of the multi-function IC card 21 independently.

As shown in FIG. 7C, the multi-function IC card 21 reads out the balance from the amount information memory part 212 of the card by a stored balance read out processing (step 651) with an inquiry key detection and displays the stored balance in the display part 215 by a display processing (step 652). The multi-function IC card 21 stands by for the next key input (step 653), while the balance is displayed. If the owner leaves the card alone with the balance displayed, a time-over is detected after an elapse of a predetermined time, control is handed over to a consummation processing (step 622), and the power is turned off for a consummation.

Meanwhile, if the owner further hits the inquiry key when the card is in a balance displaying mode, the hitting is detected by an inquiry key input detection processing (step 655), and the multi-function IC card 21 reads out the most recent of the dates recorded in the date of the transaction detail memory part and displays the date information on the display part 215 by a display processing (step 657). After the date information is displayed, the multi-function IC card 21 stands by for the next key input in a key input stand-by processing (step 658). If the owner leaves the multi-function IC card 21 alone, a time-over is detected (step 659) and the processings are consummated. If the inquiry key is further hit, the inquiry key detection processing (step 660) detects the input, so that the most recent piece of amount information of the transaction date is read from the transaction detail memory part in step 661. The amount information is then displayed on the display part 215 by a display processing (step 662); e.g. a number with a positive sign is displayed if the transaction is an amount replenishment. From the inquiry key input detecting processing (step 653) after the stored balance inquiry step to amount information processing (step 662), as long as an inquiry key hitting is detected, the transaction date and the transaction amount are displayed alternately in counter-chronological order. After all pieces of transaction detail are displayed, the most recent piece of information on transaction detail is displayed. The data stored in the transaction detail memory part is displayed repeatedly in counter-chronological order, until control is handed over to a control by either a consummation processing (step 622) that turns off the power by detecting a hitting of a power key of the input keys 216 or a card-usage-ready status processing (step 631), for instance, pursuant to a zero key detection processing (step 664).

The owner can confirm the stored balance by this balance inquiry. If necessary, he can decide whether to replenish an amount to the card or transfer an amount to his deposit account. By checking the transaction detail, he can determine when and how many of purchases, replenishments or redepositings were made. The processings can be consummated with a power key at any point, or a card-usage-ready status can be created with a numeric key so that a processing can be executed.

When an owner makes a purchase with the multi-function IC card 21 after he puts it in a card-usage-ready status, he inserts it into the seller's POS terminal device, which is a card reading terminal. The card is inserted into the card reading/writing part 521 of FIG. 5A, so that it can communicate bi-directionally with the card contacting part 217.

As shown in FIG. 7B, after a series of judgment steps of a card-usage-ready status display processing (step 631) of the multi-function IC card 21, the multi-function IC card 21 detects that it is inserted into the card's reading/writing part 521 of a card reading/writing unit 52, by a receipt at the card's contacting part 217 of a signal from a POS terminal device (YES in step 637). Next, to confirm that the POS terminal device is a valid reading terminal, the multi-function IC card 21 reads out the stored keyword and bank number from the keyword memory part 213 and notifies the POS terminal device, which is a reading terminal. Then, the multi-function IC card 21 stands by to receive the information on the amount and the date of the owner's purchase from the reading terminal in a receiving consummation judgment processing (step 639). The information on the amount and date of a purchase is inputted by a POS registering unit 51 of the POS terminal device, which is a reading terminal, and sent to the card. When the multi-function IC card 21 detects a consummation of receiving the information, it reads out the stored balance from the amount information memory part 212 in a balance deficiency judgment processing (step 640) to compare it with the purchase amount. Since a payment is possible if the stored amount is greater than or equal to the purchase amount, the multi-function IC card 21 reduces the purchase amount from the stored balance and revises the data of the amount information memory part 212 as the new stored balance. In a transaction detail memory processing (step 642), the multi-function IC card 21 memorizes the data on the amount and date of the purchase as an additional transaction detail memory of the amount information memory part 212. This additional memory is stored in a predetermined memory area, so that a read-out in counter-chronological order in response to an inquiry of the stored balance and transaction detail can be performed.

Next, the multi-function IC card 21 displays the purchase amount in its display part 215 pursuant to an amount display processing (step 643). The multi-function IC card 21 notifies the POS terminal device 4 of the processing consummation of the purchase by sending a processing consummation signal to the POS terminal device (step 644) with this display on. A mutual verification based on what is displayed enables the owner to confirm the purchase amount with the amount actually paid by the card, when he receives the card returned from the insertion to the POS terminal.

Meanwhile, if a balance is found to be not sufficient for the purchase amount in a stored balance judgment processing (step 640), the information that the stored balance is not sufficient is sent to the POS terminal in step 645. The POS terminal device 4 that receives this information notifies this condition to the POS terminal device operator and advises him to forego the commercial transaction, change the amount paid with the card or use other method of commercial transaction. This helps the seller to handle a customer flexibly.

After these processings are completed, the multi-function IC card 21 changes the control to stand by for a detection of a next input intervention (step 632), and stands by until a key input or a receiving of a signal from the POS terminal device 4 is detected. In the mean time, if no detection is made for a predetermined time period, a time-over is detected in the time-over judgment (step 633) and the power is turned off.

Figure 3:
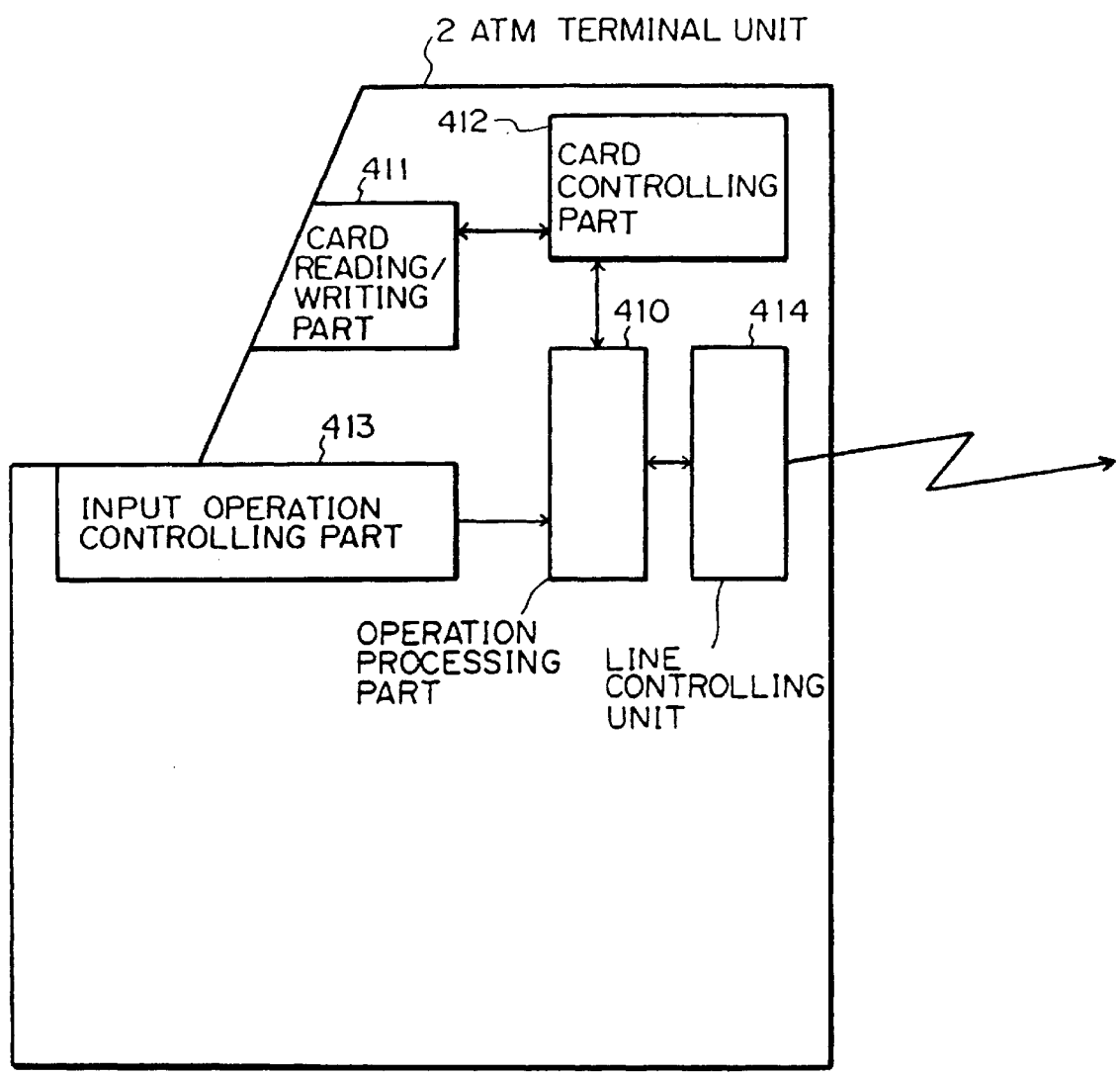
FIG. 3 shows the preferred embodiment of a bank center device.

(2) ATM Terminal Unit 2 (Refer to FIG. 3.)

Ordinarily, an ATM terminal unit 2 is connected with a bank center device 3 and is and equipped with a medium card reading/writing part 411, a medium card control part 412, an input operation control part 413, an operation processing part 410 and a line controlling unit 414.

The ATM terminal unit 2 writes the information about the amount the owner transfers between his bank deposit account and the multi-function IC card 21 i.e. the cashless medium 1.

Figure 8A:
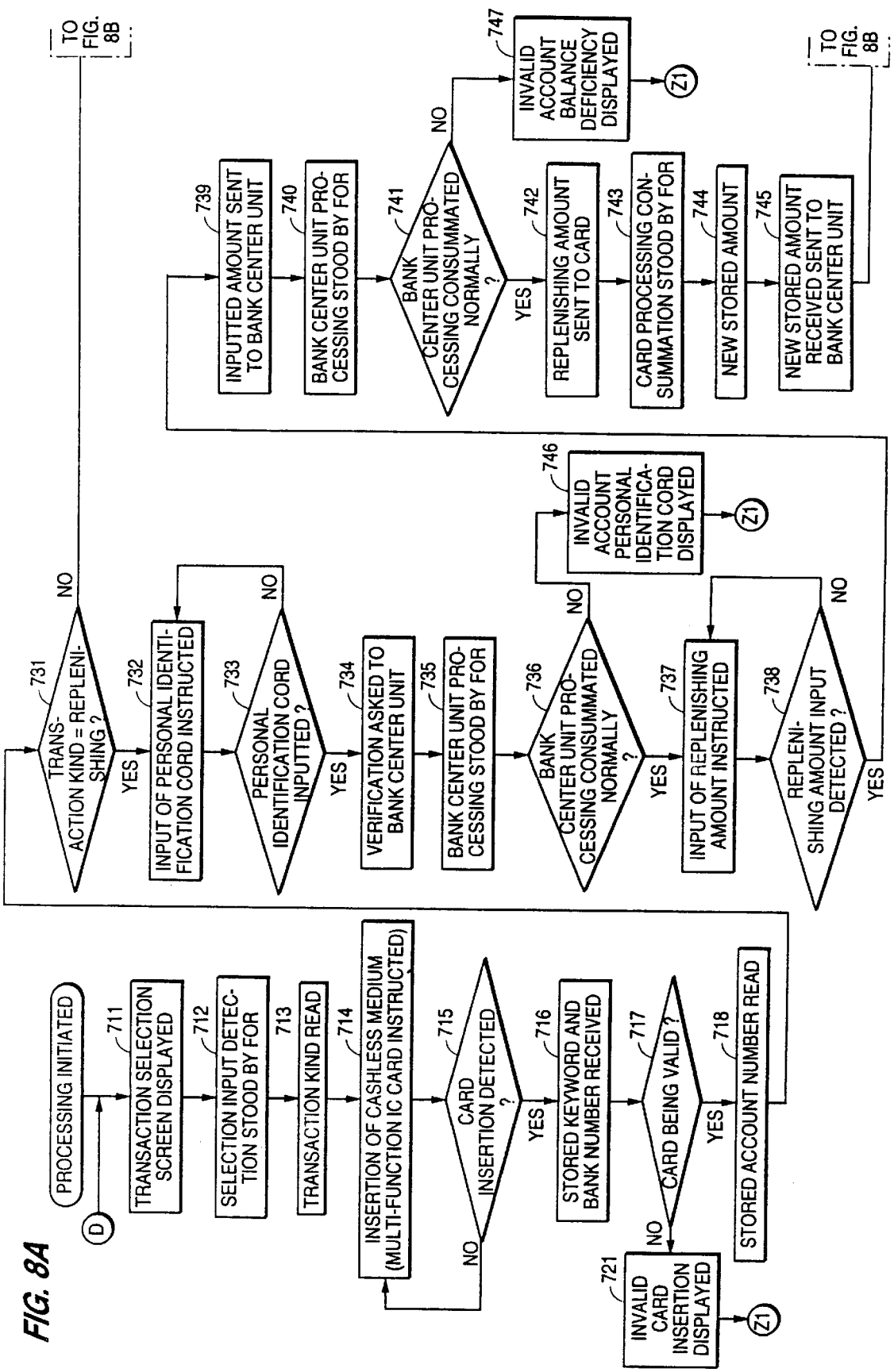
FIG. 8 shows the processing flow for an ATM terminal unit.
Figure 8B:
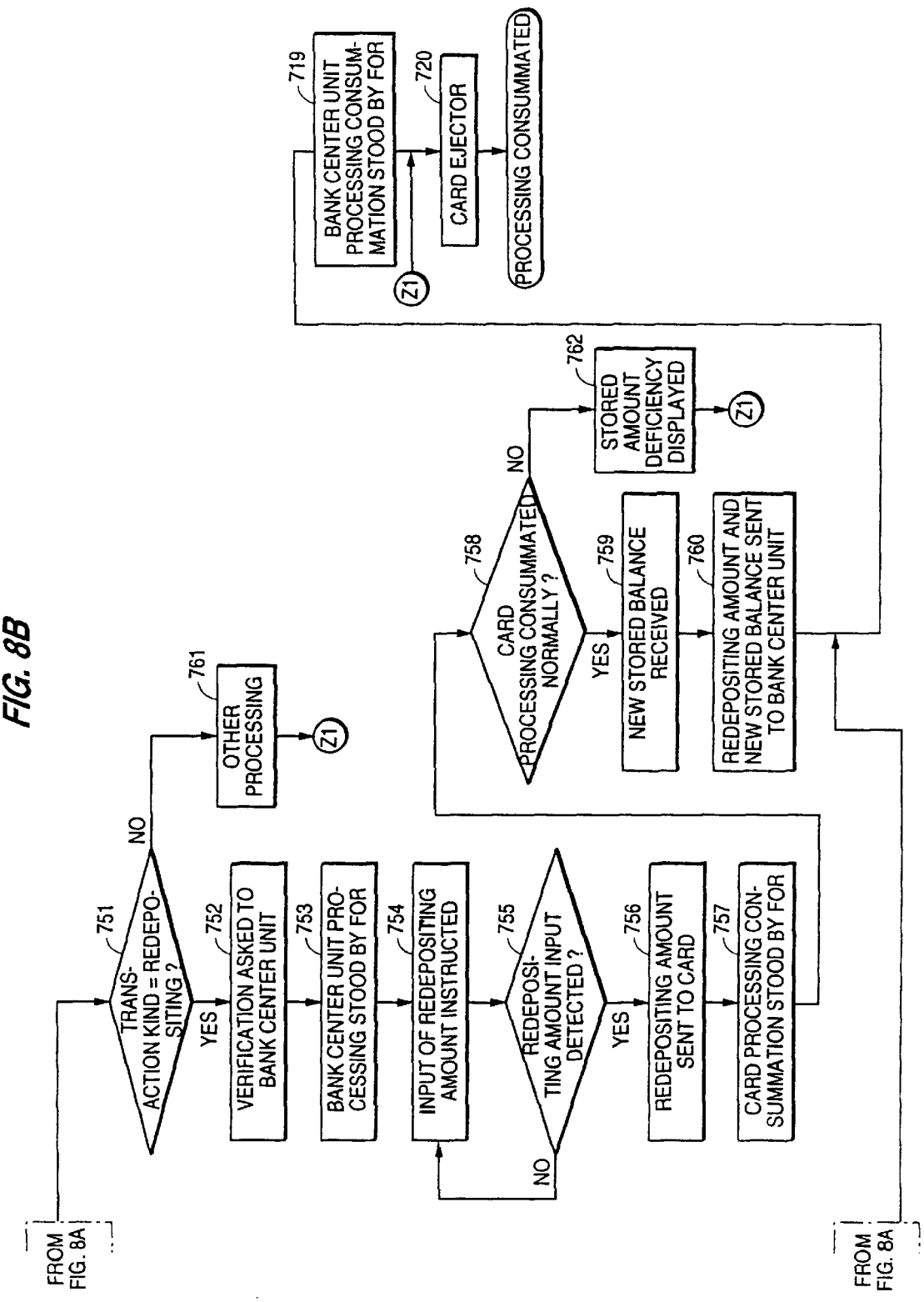

The following is an explanation of the actions shown in FIG. 8.

The owner inputs the valid personal identification code of the card by turning on the power of the multi-function IC card 21. After confirming the card-usage-ready status, he makes a selection input of a transaction kind to an ATM terminal unit 2. At this time, the ATM terminal unit 2 instructs the owner to select a transaction kind in a transaction selection screen display processing (step 711) by having him make a selection of input of a transaction kind. The owner makes the selection input of a transaction kind by following this instruction. After detecting an input in a condition of standing by for the detection of a selection input (step 712), the ATM terminal unit 2 reads the transaction kind selected by the input operation control part 413 (step 713). Here, the ATM terminal unit 2 displays an instruction to insert the multi-function IC card 21 and stands by until a card insertion to the card reading/writing part 411 is detected. The detection of the card insertion triggers a communication between the ATM terminal unit 2 and the multi-function IC card 21, and the ATM terminal unit 2 receives the information on the card's keyword and bank number (step 716). Using these data, a validity check of the multi-function IC card 21 is performed (step 717). If it is judged to be invalid (NO), the ATM terminal unit 2 displays an invalid card insertion by a display step 721 and concludes its processing by ejecting the card (step 720). If it is judged to be valid (YES), the ATM terminal unit 2 reads the bank deposit account number from the multi-function IC card 21 (step 718). The ATM terminal unit 2 judges whether the transaction kind is an amount replenishment by a judgment processing (step 731) that judges the transaction kind inputted by an owner. If the transaction kind is an amount replenishment (YES), the ATM terminal unit 2 displays an instruction to input the personal identification code of the account (step 732), and stands by for an input of the personal identification code (step 733). When the personal identification code is inputted, the ATM terminal unit 2 sends the transaction kind, the deposit account number and personal identification code to the bank center device 3 using a line controlling unit (step 734) and asks for a validity check. The ATM terminal unit 2 stands by for the check processing by the bank center device 3 (step 735), and judges whether the check result is normal or not. If the ATM terminal unit 2 judges the personal identification code to be invalid, the invalidity of the personal identification code input is displayed to the owner (step 746) and terminates its processings after ejecting the cashless medium 1. If the ATM terminal unit 2 judges the personal identification code to be valid, the ATM terminal unit 2 instructs the owner to input the amount he wants to replenish to the cashless medium 1 (step 737). After detecting the amount input consummation in an amount input detection processing (step 738), the replenishing amount is sent to the bank center device 3 (step 739). This amount is notified to the bank center device 3 as the withdrawal amount from the deposit account. Next, the ATM terminal unit 2 stands by for the consummation of the processing of the bank center device 3 (step 740) and judges whether it is normal (step 741). If the ATM terminal unit 2 judges that the consummation is abnormal (NO), the owner of the multi-function IC card 21 has an insufficient balance in his deposit account, and the owner is notified of his account balance deficiency (step 747), and the ATM terminal unit 2 terminates its processing. If the ATM terminal unit 2 judges that the consummation is normal (YES), the owner's withdrawal of his inputted amount is confirmed and the ATM terminal unit 2 knows it is possible to execute an amount replenishment to the multi-function IC card 21. Then, the ATM terminal unit 2 sends the replenishing amount to the multi-function IC card 21 in a communication processing (step 742). The ATM terminal unit 2 stands by for the consummation of the replenishment processing within the multi-function IC card 21 in a card processing consummation stand by processing (step 743). When the ATM terminal unit 2 consummates this processing, it receives the new balance stored in the multi-function IC card 21 from the card (step 744), and sends the new balance to the bank center device 3, which in turn writes the new balance to its medium balance log file 324. The bank center device 3 stands by for the processing consummation (step 719), and when the ATM terminal unit 2 receives the consummation notice, it ejects the multi-function IC card 21 in a card ejection step 720. The owner receives the ejected the multi-function IC card 21 and confirms the consummation of the amount replenishment to it by taking a look at the amount indicated on the card's display part 215.

If the transaction kind is judged not (NO) to be an amount replenishment (step 731), the ATM terminal unit 2 judges whether the transaction kind is a redepositing in a redepositing judgment processing (step 751). If the transaction kind is not a redepositing, the ATM terminal unit 2 executes other processings according to the particular transaction kind and consummates its processings (step 761).

Redepositing is defined as the owner depositing at least a part of the balance stored in the multi-function IC card 21 back to his deposit account. It means that the multi-function IC card 21 transfers a part of the amount stored in the multi-function IC card 21 back to the deposit account via the bank center device 3.

If the transaction kind is judged (YES) to be a redepositing, the ATM terminal unit 2 sends the transaction kind and the deposit account number to the bank center device 3 and asks for a validity check (step 752). The ATM terminal unit 2 stands by for the processing consummation at the bank center device 3 (step 753), and instructs the owner to input the redepositing amount (step 754). When the ATM terminal unit 2 detects the input amount (step 755), the ATM terminal unit 2 notifies the multi-function IC card 21 of the redepositing amount (step 756). The ATM terminal unit 2 then stands by for a consummation of the stored balance subtraction processing within the multi-function IC card 21 (step 757), and judges whether the processing within the multi-function IC card 21 is properly consummated (step 758). If the stored balance is less than the redepositing amount, redepositing cannot be performed, and the multi-function IC card 21 sends the balance deficiency. The ATM terminal unit 2 notifies the owner who operates the ATM terminal unit 2 by displaying the result (step 762). If the intra-card processing is properly consummated, a redepositing from the multi-function IC card 21 becomes possible, and the ATM terminal unit 2 receives the new balance stored in the multi-function IC card 21 (step 759), and notifies the redepositing amount and the new balance stored in the card to the bank center device 3. The ATM terminal unit 2 stands by for the consummation of the deposit account revising stand by processing at the bank center device 3 (step 719), and after ejecting the multi-function IC card 21 (step 720), the ATM terminal unit 2 consummates its processing. Thus, the ATM terminal unit 2 can subtract the redepositing amount specified by the owner from the amount stored in the card and redeposit it to the deposit account of the bank center device 3.

Figure 5A:
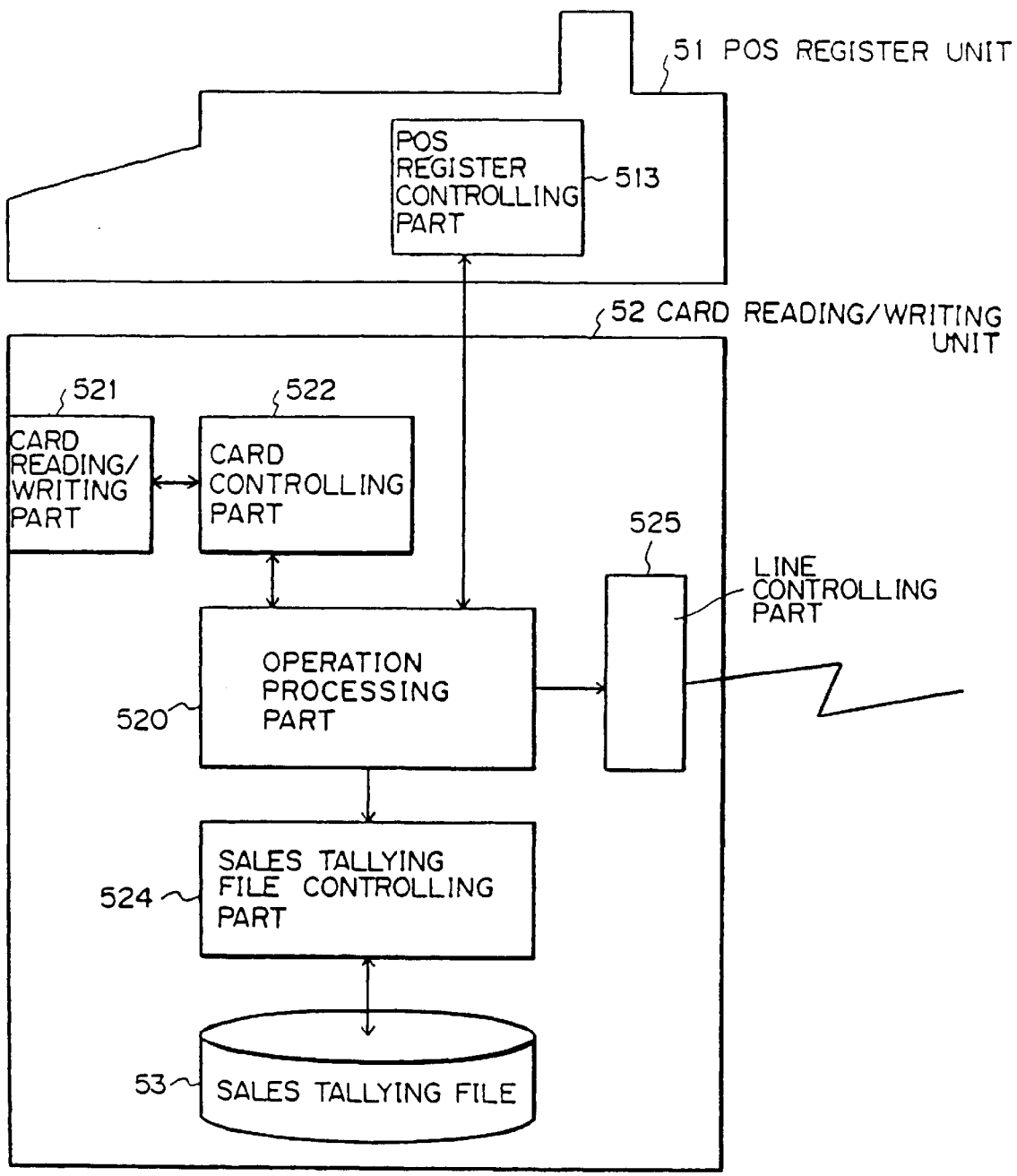
FIGS. 5A and 5B show the preferred embodiment of a POS (point of sales) terminal unit.
Figure 5B:
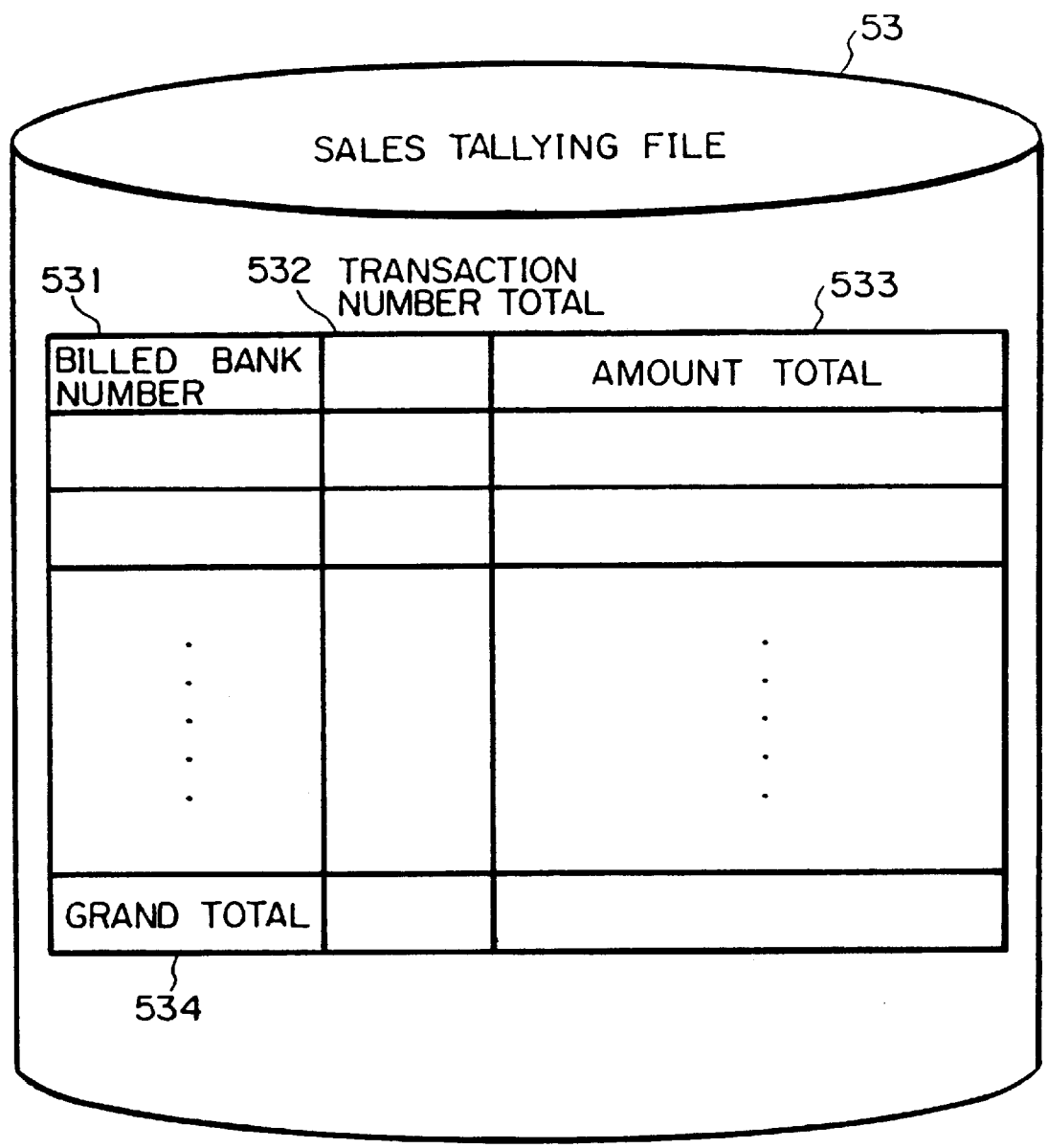

(3) A POS Terminal Device (Refer to FIGS. 5A and 5B.)

A card reading/writing unit 52 is added to an ordinary seller POS register unit 51 for merchandise sales management.

The card reading/writing unit 52 comprises a card reading/writing part 521 for controlling their reading and writing, a sales tallying file 53, a card control part 522, a sales tallying file control part 524, an operation processing part 520 and a line controlling unit 525.

The sales tallying file 53 stores a transaction number total 532 and an amount total 533 tallied by a billed bank number 531, as well as a grand total 534.

Figure 9:
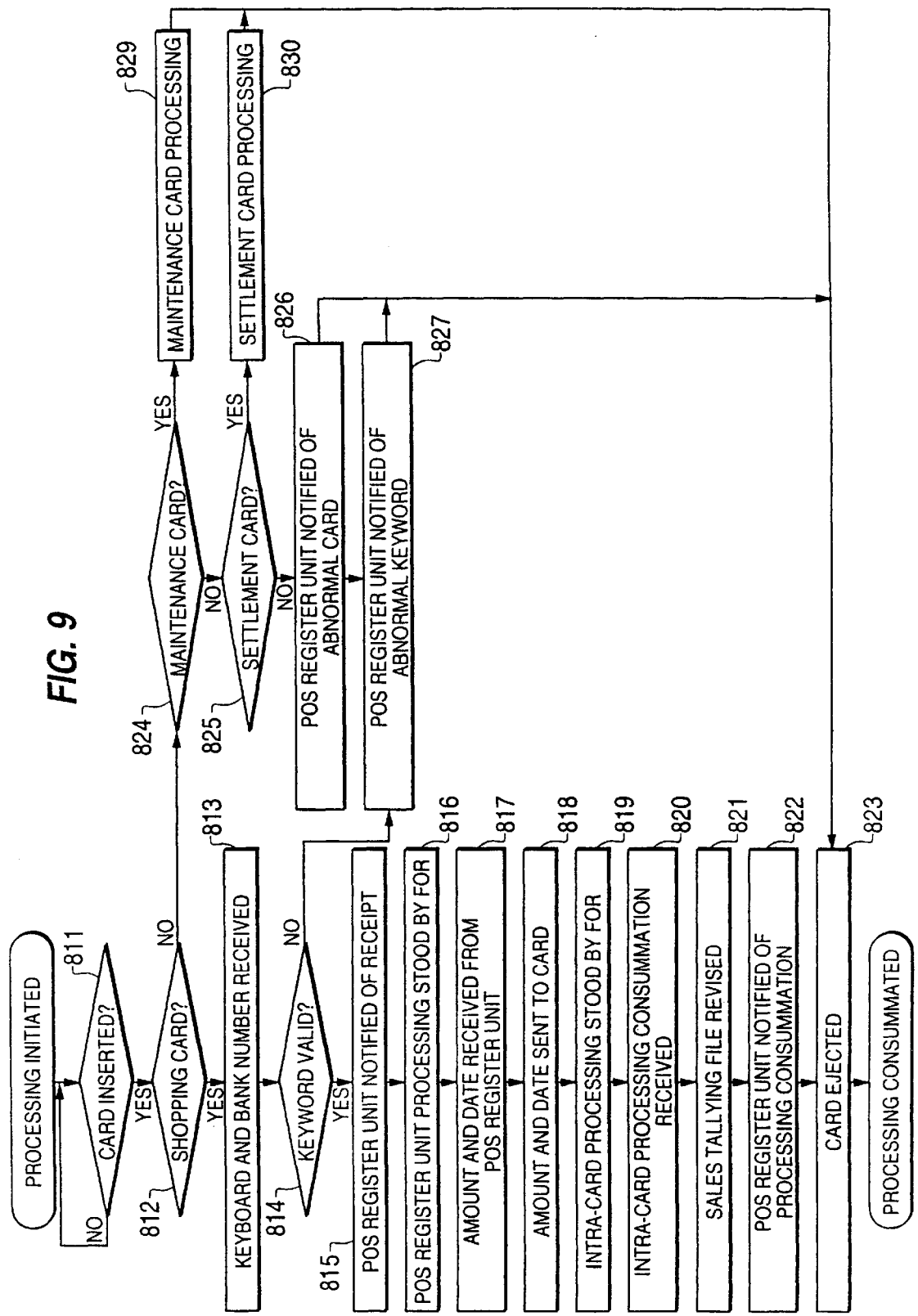
FIG. 9 shows the processing flow for a read-only terminal unit.

The following is a explanation of an action of a POS terminal device, shown in FIG. 9.

When an owner shops at a seller with the cashless medium 1, the card reading/writing unit 52 of the POS register unit 51 shown in FIG. 5A becomes a reading terminal unit of the multi-function IC card 21. The POS register unit 51 performs a shopping check-out processing by a seller. If a commercial transaction is with the multi-function IC card 21, the POS register unit 51 and the card reading/writing unit 52 perform a sales processing by communicating with each other. The POS terminal device performs its processing, when the multi-function IC card 21 is inserted into the card reading/writing unit 52. There are three kinds of the multi-function IC card 21. A shopping card for making a purchase, discussed previously, a maintenance card for maintaining the card reading/writing unit 52, and a settlement card for settling a sales tallying file that stores amount data within the card reading/writing unit 52 by a sales processing. The card inserted by a customer is limited to the shopping card among the above three kinds.

A customer inserts his card into the card reading/writing part 521 of the card reading/writing unit 52 to clear his shopping.

A POS terminal device stands by for a detection of an insertion of the multi-function IC card 21 (step 811). If a card insertion is detected, the POS terminal device judges in a card kind judgment processing (step 812) whether the inserted card is a shopping card. If the POS terminal device judges that the inserted card is in fact a shopping card (YES), the POS terminal device receives from the multi-function IC card 21 the keyword and bank number stored respectively in the keyword memory part 213 and the amount information memory part 212 (step 813). The POS terminal device then performs a validity check of the card (step 814). If it judges it to be invalid (NO), the POS terminal device sends the keyword mismatch to the POS register unit 51 in a mismatch notice processing (step 827), and ejects the card in a card ejecting processing (step 823) and consummates its processing. If the POS terminal device judges that the inserted card is valid (YES), the POS terminal device sends the information that the card is accepted by a POS register notice processing (step 815) to the POS register unit 51. After this status, normal card sales processings are executed.

First, after confirming a receipt consummation of a card acceptance notice sent to the POS register unit 51 (step 816), the POS terminal device receives the information on the purchase amount from the POS register unit 51 (step 817). At this time, the POS terminal device simultaneously receives the date as well as the amount of the commercial transaction from the POS register unit 51. The information on the amount and the date of the commercial transaction is sent to the multi-function IC card 21 in a card sending processing (step 818). The POS terminal device stands by for a consummation of the intra-card purchase processing (step 819). When the POS terminal device receives the consummation of the purchase processing within the multi-function IC card 21 by a card processing judgment processing (step 820), the POS terminal device revises the sales tallying file 53 in a file revising processing (step 821), using the data of the keyword and bank number already received from the card and the data of the amount and date of the commercial transaction as the revision data. The revision is executed by adding the number and amount of the commercial transaction classified by the bank number of the issuing bank. All the commercial transaction data identified by the same bank number are characteristically tallied in a memory on the sales tallying file 53. Therefore, even if the seller deals with a large number of customers, the memory capacity on the sales tallying file 53 becomes the capacity governed by the number of financial institutions that issue the multi-function IC card 21.

When the revision of the sales tallying file 53 is consummated, the POS terminal device sends a processing consummation in a processing consummation notice processing (step 822) to the POS register unit 51. After ejecting the multi-function IC card 21, in a card ejecting processing (step 823), the POS terminal device consummates its processing.

If the inserted card is detected in the card kind judgment processing (step 824) to be a maintenance card for the POS terminal device rather than a shopping card, the POS terminal device has its maintenance personnel maintain the hardware of the card reading/writing unit 52 or the software that works on the operation processing part 520 in a maintenance card processing (step 829).

Meanwhile, if the inserted card is detected by the card kind judgment transaction (step 825) to be a settlement card, the POS terminal device performs a closing processing of the sales tallying file 53 in a settlement card processing (step 830). The closing processing is performed in preparation for sending the sales tallying file 53 to the bank center device 3 shown in FIG. 1. If any of the sales tallying data is closed, it will be re-added as one sales tallying file. The communication to the bank center device 3 is performed directly by a communication line controlled primarily by the bank center device 3 or by a transmission system to it on a side connected with the POS register unit 51. The content of the communication to the bank center device 3 or the transmission system comprises a datum part codified in a manner predetermined by the bank center device 3 and an ordinary text datum part "as is" of the sales tallying file 53. The codification is meant to be for security protection of the data in the sales tallying file 53, while they are being sent to the bank center device 3. (The sending processing to the bank center device 3 is not shown in the drawings.)

Figure 4:
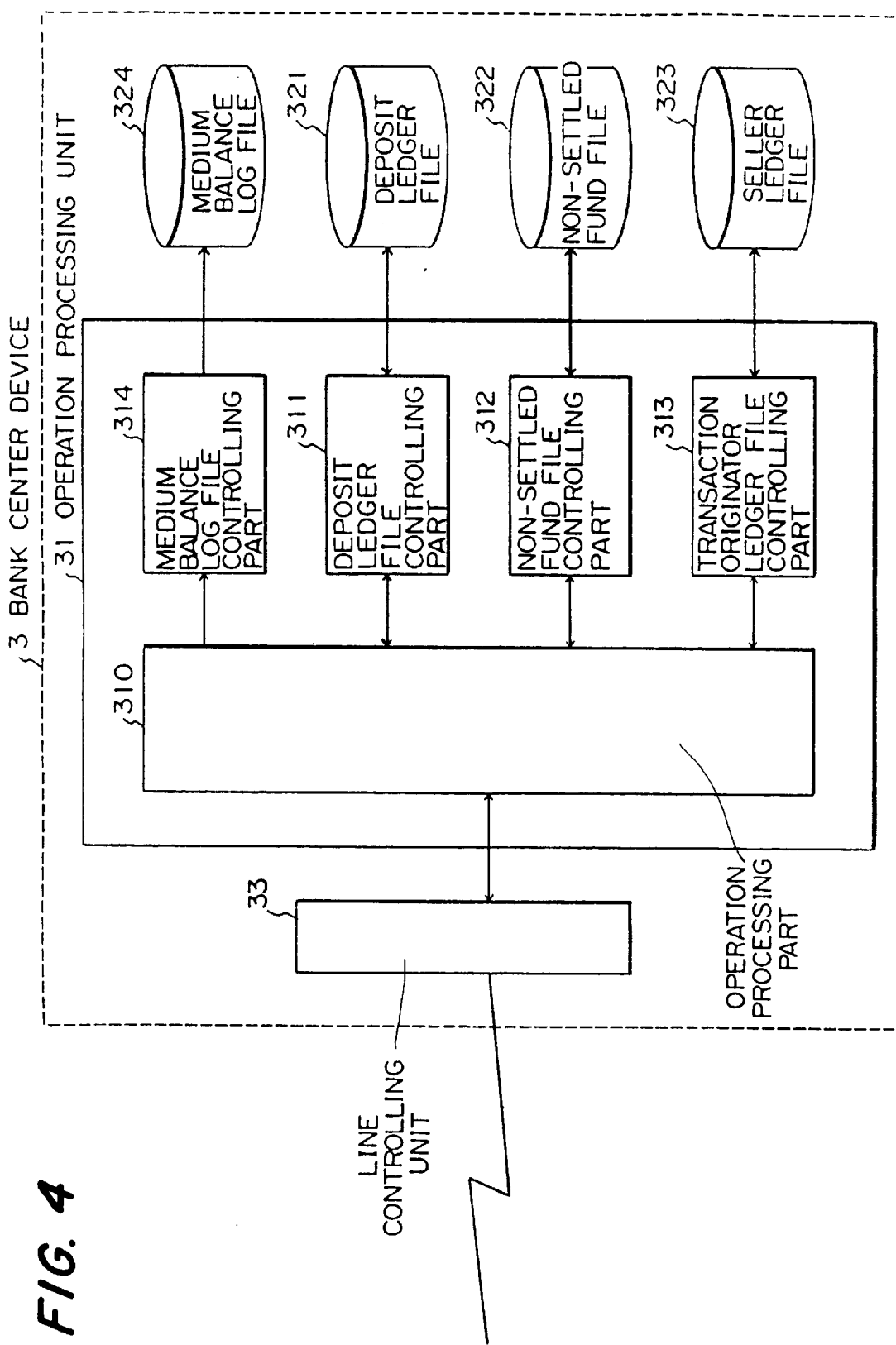
FIG. 4 shows the preferred embodiment of an ATM (automatic teller machine) terminal unit.

(3) The Bank Center Device 3 (Refer to FIG. 4.)

The bank center device 3 comprises the following files: a deposit ledger file 321 , a non-settled fund file 322, a seller ledger file 323 (for a seller's account) and a medium balance log file 324. It also comprises an operation processing part 31 (which includes a deposit ledger file control part 311, a non-settled fund file control part 312, a seller ledger file control part, a medium balance log file control part 314 and an operation control part 310) that controls reading and writing of each of the above files, and a line controlling unit 33.

The following is an explanation of the bank center device 3, by referring to FIGS. 10A and 1OB.

The bank center device 3, as shown in FIG. 3, performs on-line real-time processing actions, such as moving funds between the deposit ledger file 321 and the non-settled fund file 322 and logging the stored balance, when the card's owner replenishes the multi-function IC card 21 or redeposits a part of the amount stored in the multi-function IC card 21. It also performs batch processing actions, such as making a fund settlement between the non-settled fund file 322 and the seller ledger file 323 by up-loading the sales tallying file 53 in the POS terminal device.

As shown in FIG. 10A, in the on-line real-time processing with the ATM terminal unit 2, after the customer begins a processing at the ATM terminal unit 2, the bank center device 3 receives the transaction kind, the account number for identifying the deposit ledger file 321 and the personal identification code of the account from the ATM terminal unit 2 (step 911). Then, the bank center device 3 reads the content of the deposit ledger 321 (step 912). When the bank center device 3 detects a replenishment processing in a transaction kind judgment processing (step 921), the bank center device 3 judges whether the personal identification code inputted by the customer matches that memorized in the deposit ledger file 321 in a judging step 922. If the bank center device 3 detects a mismatch, it sends the information about the mismatch of the personal identification code to the ATM terminal unit 2 (step 933), rejects a fund withdrawal from the deposit ledger file 321 and consummates the processing. If the bank center device 3 detects a match, it stands by to receive a data about the amount the customer inputs from the ATM terminal unit 2 (step 924). The receiving amount data is the data of the amount replenished to the cashless medium 1. The amount is subtracted from the customer's account in the deposit ledger file 321 and added to the non-settled fund file 322. On receiving the amount data, the bank center device 3 compares the amount with the customer's account balance memorized in the deposit ledger file 321 in a judging processing (step 925). If the account balance is less than the replenishing amount, the bank center device 3 sends an account balance deficiency to the ATM terminal unit 2 (step 932) and consummates the processing. If a sufficient account balance is found, the bank center device 3 sends to the ATM terminal unit 2 that its processings are consummated normally (step 926). The ATM terminal unit 2 stands by to receiveat information on a new stored balance that the bank center device 3 sends after the normal processing consummation notice (step 927). This new stored balance is the amount sent back from the ATM terminal unit 2 after the replenishing amount and the current stored balance are added together within the cashless medium 1. After the receiving is consummated, the bank center device 3 revises the deposit ledger file 321 by subtracting the replenishing amount from the customer's account balance memorized in the deposit ledger file 321 by a revising processing (step 928). Next, the bank center device 3 revises the non-settled fund file 322 by adding the replenishing amount to the balance of the non-settled fund file 322. When the file revision is consummated, the bank center device 3 stores a record by writing the new stored balance of the cashless medium 1 received in a log storage processing (step 930) into the medium balance log file 324. Then, the bank center device 3 notices the ATM terminal unit 2 that it has consummated its processings in a sending processing (step 931).

If the bank center device 3 finds that the transaction kind from the ATM terminal unit 2 is a redepositing in a transaction kind judging processing (step 941 ), the bank center device 3 sends a processing continuation to the ATM terminal unit 2 (step 942). The bank center device 3 stands by to receive the data on the redepositing amount and the new stored balance of the cashless medium 1 from the ATM terminal unit 2 (step 943). On receiving the data from the ATM terminal unit 2, the bank center device 3 revises the deposit ledger file 321 by adding the redepositing amount data to the customer's account balance 321 in an adding processing (step 944). Then, the bank center device 3 revises the non-settled fund file 322 by subtracting the redepositing amount from the balance of the non-settled fund file 322 in a subtracting processing (step 945). Thus, the bank center device 3 enables a customer to redeposit the amount from the cashless medium 1 to his deposit account. The cashless medium 1 hands control over to a processing of logging the cashless medium 1 (step 930) and notifies the ATM terminal unit 2 that the bank center device 3 has consummated its processings by a consummating processing (step 931).

If the bank center device 3 finds a transaction from the ATM terminal unit 2 to be neither a replenishing processing nor a redepositing in the transaction kind judging, the transaction is processed as another transaction the bank center device 3 performs in step 946.

Figure 10B:
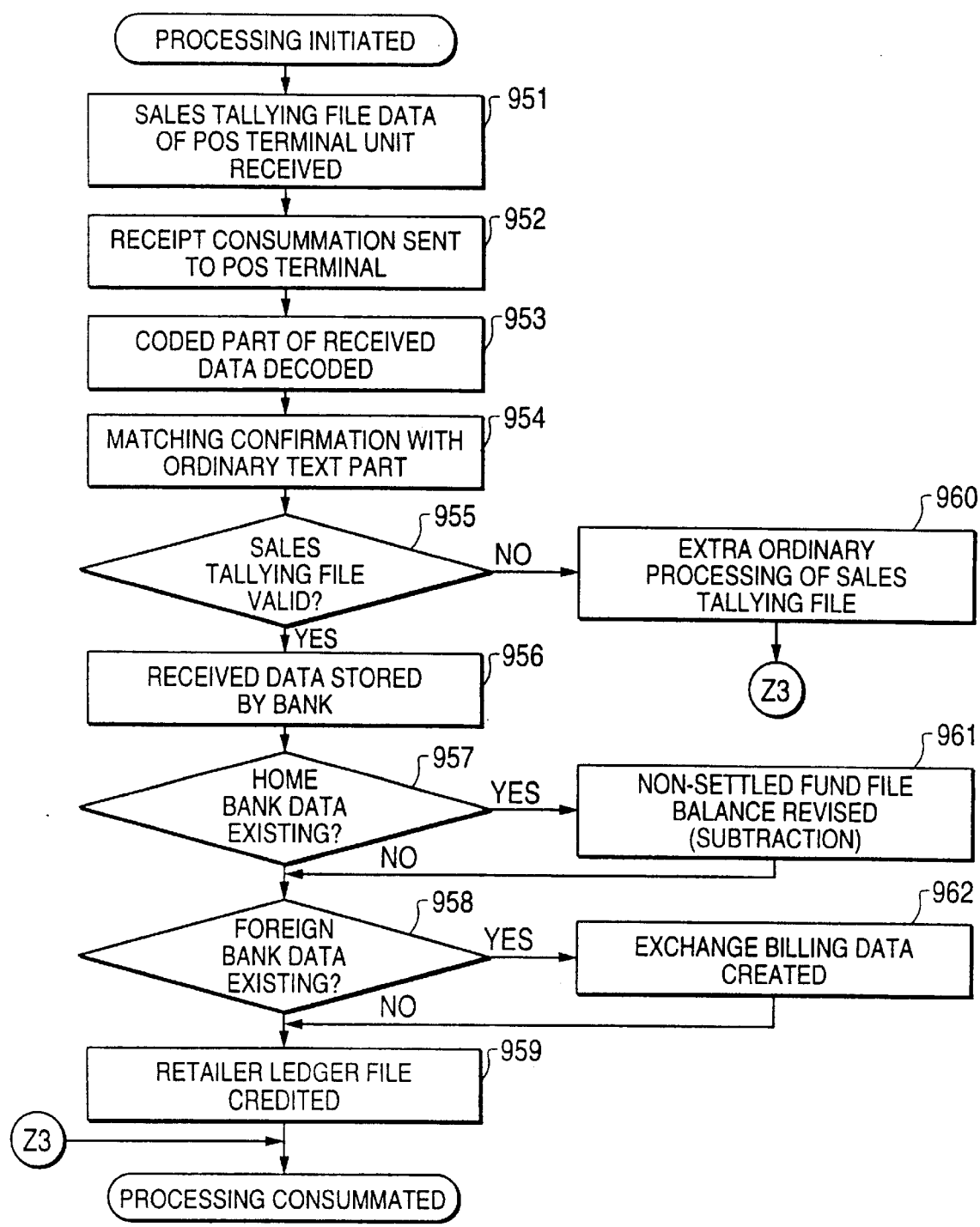

A seller can make a fund settlement of the seller ledger file 323 by billing the amount stored in the sales tallying file 53 within the POS terminal device to a bank. The bank center device 3 receives the data of the sales tallying file 53 from the POS terminal device (step 951), as shown in FIG. 10B. On consummating the data receipt, the bank center device 3 notifies the POS terminal device of the data receipt consummation (step 952), and moves to a decoding processing of the received data (step 953). The codified part is the codification of the sales tallying file 53, and its content becomes the same as a simultaneously sent ordinary text part of the sales tallying file 53 when it is decoded. To confirm it, the bank center device 3 performs a matching check of the decoded result of the codified part and the ordinary text part in a validity judgment processing (step 955). If an unmatched datum is found, the sent sales tallying file 53 is not deemed to be valid, and the bank center device 3 performs an extraordinary processing (step 950). The bank center device 3 judges that the data sent from the POS terminal device 4 are valid only after all of the data are matched. The bank center device 3 rearranges the data by an issuing institution in a processing of data sorting that uses the bank number in the sales tallying file 53 as a key (step 956). The bank center device 3 judges the data on the sales tallying file 53 with the bank number of the bank center device 3 (step 957), and sorts out the data pertaining to the particular bank that owns the bank center device 3. The bank center device 3 deducts the data of the particular bank from the balance of the non-settled fund file 322 in a non-settled fund subtraction processing (step 961) and revises the non-settled fund file 322. Next, if the bank center device 3 finds the amount data of the cashless medium 1 issued by another bank in an another bank data judging processing, the bank center device 3 performs a processing of creating exchange billing data for the other bank (step 962). The bank center device 3 revises the processing of drawing funds to the seller ledger file 323 in a fund drawing processing (step 959), and performs the fund drawing to the seller ledger file 323 of the seller that sent the sales tallying file 53, and consummates the processing.

The following is a description of each unit necessary for an electronic money transaction.

We assume here the use of the multi-function IC card 21 as the cashless medium 1 for an electronic purse processing, and the POS terminal device for a seller's reading/writing terminal unit, and the ATM terminal unit 2 for a bank's reading/writing terminal unit.

Figure 6A:
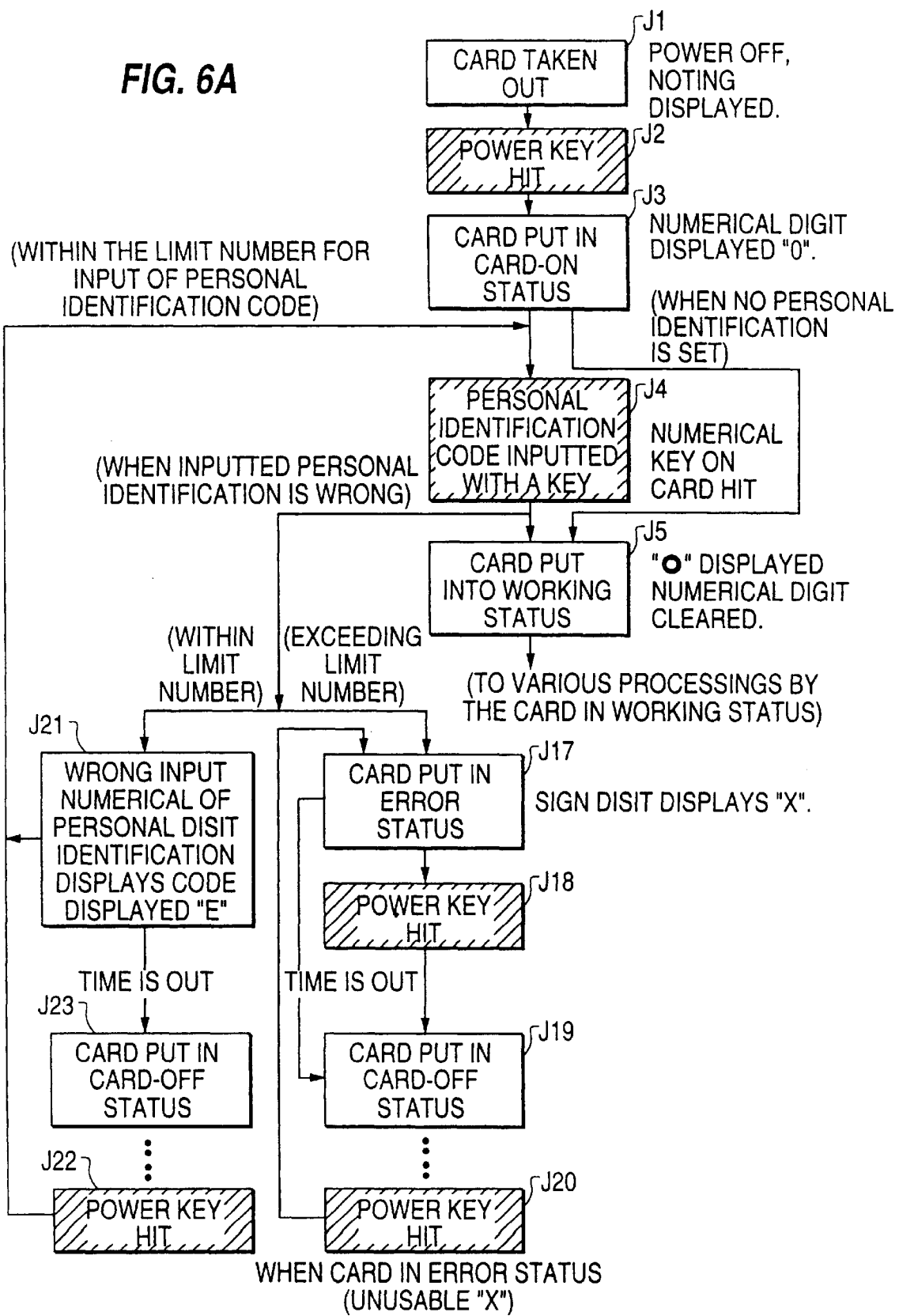
FIGS. 6A and 6B shows the basic processing flow of a multi-function IC card.
Figure 6B:
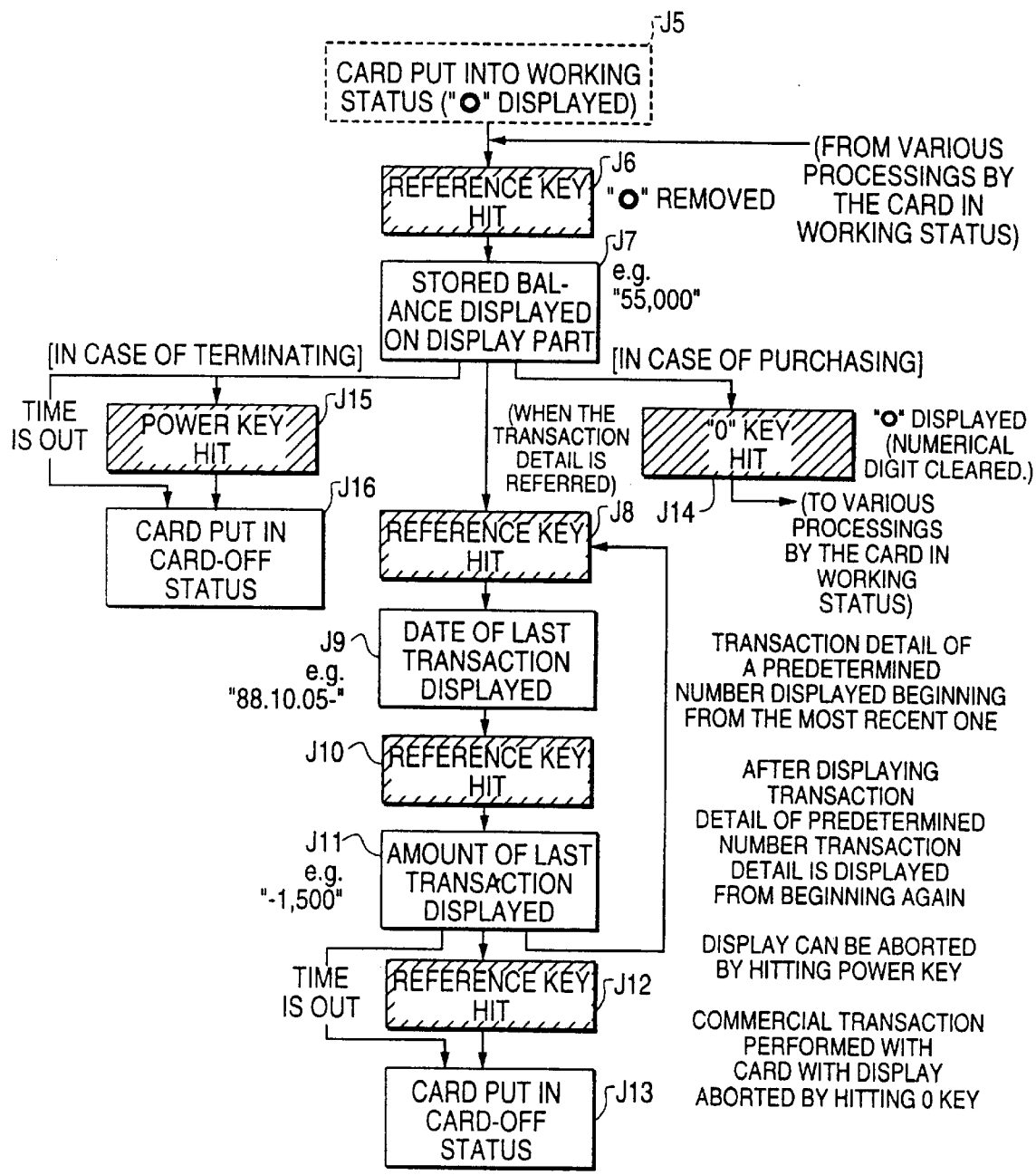

(1) A Basic Operation of the Multi-function IC Card 21 (Refer to FIG. 6.)

In the initial condition of the multi-function IC card 21 that is issued by a bank to its depositor, the bank number and the deposit account number of the issuer are stored in the amount information memory part 212 and keywords, such as the personal identification code preregistered by the depositor, are stored in the keyword memory part 213.

If the card is taken out (J1), its power is confirmed to be turned on (J3) by hitting a power key (J2), and the personal identification code is inputted properly (J4). Then the multi-function IC card 21 is in a working condition (J5). When an authorized user wants to confirm the stored amount, such as in a case as of a disbursement from his bank deposit account or immediately before a purchase, he hits a reference key KS (J6) and the current stored balance is displayed on the display part 215 (J7).

When he further hits the reference key KS (J8), the date of the most recent (i.e. the last) transaction is displayed (J9). When he further hits the reference key KS (J10), the amount of the most recent (i.e. the last) transaction is displayed (J11). When he further hits the reference key KS, the date and amount of the next most recent transaction is displayed in LIFO order. This display can be used as information for a home ledger entry.

Since the multi-function IC card 21 has few display digits in the preferred embodiment of this invention, they sequentially display the date and the amount of the transaction with two hittings of the reference key KS. However, if the display digits or rows are increased, a simultaneous display of the date and amount of more than one transaction become possible, for instance with a single hitting of the reference key KS.

The card in a working condition keeps the status of power-on, while it is inserted to the card reading/writing unit 52 or the ATM terminal unit 2, but after it is ejected from them, its power is turned off by an automatic time off function after an elapse of a predetermined time period (J13). When the power is on, the power of the multi-function IC card 21 is turned off at the moment when the power key is hit (J12).

Also, in a status of J7, where the balance is displayed in the display part 215, a hitting of a zero key (J14) puts the card in a shopping processing status. If a power key is hit (J15) or time is out in this status (J7), the card is put in power-off status (J16).

Meanwhile, there are two cases for a wrong input of the personal identification code in a key input status of the personal identification code (J4).

If the limit number of wrong inputs of the personal identification code is exceeded, the card is put in an error status (J17). When time is up or the power key is hit (J18), the card is put in a power-off status (J19). In the preferred embodiment of this invention, the cashless medium 1 memorizes the change into this status, and the cashless medium 1 displays (J17) on its display part 215 that the card is in an error status and cannot restore its normal status (J3), even if the power key is hit thereafter.

If the limit number of wrong inputs of the personal identification code is not exceeded, the cashless medium 1 displays (J21) an error of a wrong input of the personal identification code, such as "E", on its display part 215. Another key hitting puts the cashless medium 1 in a status of J4 again. Alternatively, if a key is not hit, the card is put into a power-off status (J23) when time is up. In the preferred embodiment of this invention, since the number of wrong inputs of the personal identification code is memorized in its memory means 11, even if the power is turned off and even if the power key is hit again, after time is up (J22), the cashless medium 1 is up into a status (J4), as long as the cashless medium 1 is in a status where the limit number of wrong inputs of the personal identification code is not exceeded.

(2) An Amount Replenishment to the Cashless Medium 1 (Refer to FIG. 11.)

When the stored amount is replenished from the deposit account with the ATM terminal unit 2, the owner has to put the multi-function IC card 21 in a working status (J5) by the actions so far described. If he inserts it in the ATM terminal unit 2 by performing a predetermined inputting operation, the stored balance is replenished, and the display part 215 displays the amount and it could be substituted for a receipt.

After detecting an input to instruct an amount replenishment with a transaction selection key and the card insertion (K2), the ATM terminal unit 2 reads the stored bank number and account number from the card (K3, K4). After verifying its validity, the ATM terminal unit 2 stands by to review the input of the personal identification code and and the amount (K5). After a proper input operation is performed, the ATM terminal unit 2 sends the inputted replenishing amount to the card (K6). The card, i.e. the cashless medium 1, calculates the new stored balance by adding this amount to the current stored balance (K7) and sends it to the ATM terminal unit 2 (K8). The ATM terminal unit 2 reads all these data (the bank number, the account number, the personal identification code of the account, the inputted replenishing amount, and the new stored balance) (K9) and sends them in a batch to the bank center device 3 (K10).

The bank center device 3 reads the proper deposit account ledger from the deposit ledger file 321 (K11), confirms the personal identification code (K12), revises the account balance (K13), updates the deposit ledger file 321 (K14), revises the non-settled fund file 322 by adding the inputted replenishing amount (K15), writes the new stored balance to the medium log file 324 (K16), and sends a transaction consummation notice to the ATM terminal unit 2 that all these processings have been consummated (K17).

After receiving the notice, the ATM terminal unit 2 sends a transaction consummation order to the card, i.e. the cashless medium 1 (K18), the cashless medium 1 rewrites the stored balance (K19), stores a transaction record by creating it (K20), displays the replenishing amount to its display part 215 (K21) and consummates all processings. After receiving a notice that the card's processings have been consummated from the card (K21), the ATM terminal unit 2 ejects the card (K22). Thereafter, the cashless medium 1 displays a replenishing amount (K23) in its display part 215, and turns its own power off (K24) by a hitting the power key or by turning off automatically when time is up. In extraordinary cases discussed earlier such as the mismatch of the personal identification code, the account balance deficiency, the corresponding processings are performed as shown in the flow charts shown later.

A redepositing of an excess stored amount to the deposit account is performed basically in the same manner as the amount replenishment to the cashless medium 1, although the steps are more or less different in the input of the personal identification code and its confirmation.

Figure 12:
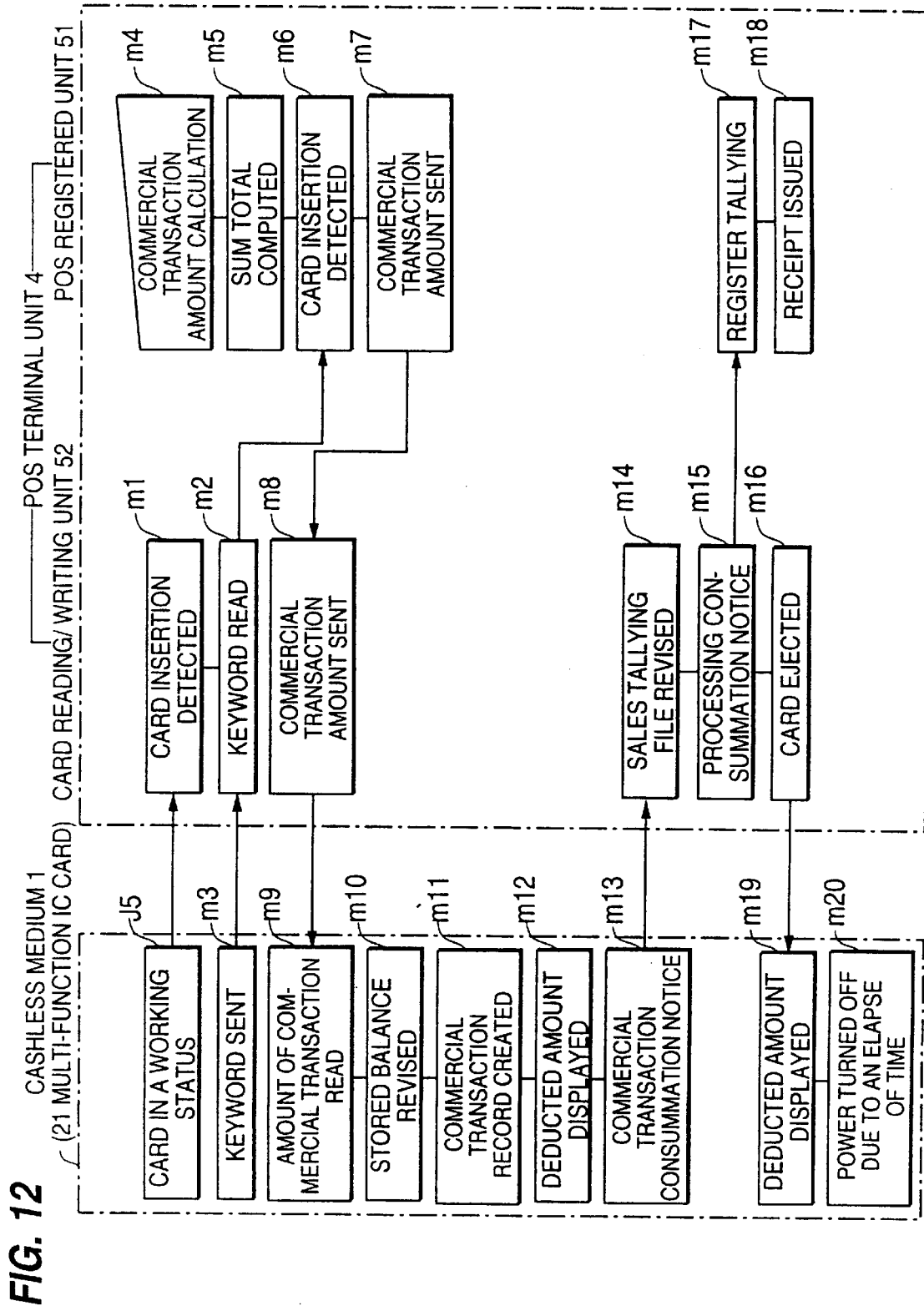
FIG. 12 shows the processing flow of a purchase with a card.

(3) A Shopping With the Cashless Medium 1 (Refer to FIG. 12.)

At a shopping check out time, if an owner of the cashless medium 1, i.e. the multi-function IC card 21, inserts the multi-function IC card 21 in working order into a seller POS terminal device 4, the purchase amount total is deducted from the stored balance. The purchase amount deducted from the multi-function IC card 21 is displayed in the display part 215 of the multi-function IC card 21, which amount can be matched with a shopping receipt received separately.

When the card reading/writing unit 52 detects an insertion of the multi-function IC card 21 in a working status (M1), it stands by (M2) after reading the bank number and keyword outputted from the multi-function IC card 21 (M3). When a summation key is hit (M4) after all the sales amounts are tallied, the POS register unit 51 computes the sum (M5). Then, after detecting a card insertion (M6), the POS register unit 51 sends the purchase amount to the card reading/writing unit 52 (M7). The card reading/writing unit 52 sends the purchase amount to the multi-function IC card 21 through its card reading/writing part 521 (M8). The multi-function IC card 21 rewrites the stored balance (M10), stores the transaction record by creating it (M11), and displays the deducted amount in its display part 215 (M12). The multi-function IC card 21 then sends the transaction record to the POS terminal device 4 (M13). The card reading/writing unit 52 stores the tallied sum of the sales amount with the multi-function IC card 21 sorted by the issuing bank of the multi-function IC card 21 in the sales tallying file 53 by revising its memory (M14), and notifies the POS register unit 51 of the transaction consummation (M15) and ejects the card (M16). The POS register unit 51 that receives the consummation notice issues a receipt (M18) after making a tally (M17).

When ejected from the POS terminal device 4, the multi-function IC card 21 displays the deducted amount on its display part 215 (M19) and turns its power off (M20) when time is up or the power key is hit.

(4) Depositing of the Seller's Sales to its Bank (Refer to FIG. 13.)

After finishing the sales activities, the seller clears the POS terminal device 4. With a clearing input (N1), the card reading/writing part 521 fixes the sales tallying file (so that it become temporarily unchangeable) and sends an instruction (N2), as well as making a sending message by codification (N3) and sends the bank center device 3 of the predesignated by the POS terminal device 4 (N4).

The bank center device 3 receives such messages (N5), decodes them (N6) and classifies them into a home bank part and a foreign bank part (N7, N10). The bank center device 3 revises the the non-settled fund file 322 by deducting the amount in the home bank part (N8) and credit the seller's deposit account by revising the seller ledger file 323 (N9). The amount in the foreign bank part is billed to the appropriate bank through the exchange clearance system (N11) and credits the seller's deposit account after the non-settled fund file 322 of the appropriate bank is prepaided (N12) and its consummation is confirmed (N13). Thus, all settlements are concluded.

(5) A Method For Compensating For the Failure of the Cashless Medium 1

Cash can be used at any time, unless it's lost, but the cashless medium 1, i.e. the multi-function IC card 21, becomes unusable when it fails, whether it has a stored balance or not. The owner has to go to bank to have his failed card exchanged. However, in this system, wherein the individual transaction detail is not controlled, the bank has to make a formula for the amount of compensation, such as the following and ask the owner of the multi-function IC card 21 for an agreement.

First, the bank center device 3 searches the stored balance of the multi-function IC card 21 at the most recent transaction time from the medium balance log file 324, which is the maximum amount of compensation.

Then, the bank analyzes the trend (the rate of stored amount depletion) of the commercial transactions made with the multi-function IC card 21 to estimate the current stored balance from the last ATM transaction date. The sum of the estimated current balances will tend to approximate the sum of the actual current balances, by the law of large numbers. The estimated current balance is paid out from the non-settled fund file 322, the amount of difference from what the card owner claims is made up for (within the balance of the medium balance log file 324), and the new stored balance is computed by adding these two amounts. This sum is then stored in the amount information memory part 212 of the multi-function IC card 21 that is issued to the owner as a replacement. This difference could ordinarily be an overpayment, the loss of which could be covered by an insurance policy.

Since the deposit data is separated by the bank number into the home bank part and the foreign bank part, the revising of the seller ledger file 323 is applied with the existing settlement method, wherein the home bank part is treated as a cash deposit and can be used immediately, whereas the foreign bank part is treated as a not-yet-cleared-fund deposit and cannot be used immediately.

In this invention's preferred embodiment of the POS terminal device 4 which accommodates the cashless medium 1, i.e. the multi-function IC card 21, the POS register unit 51 is explained. In addition, if vending machines are equipped with a mechanism that accommodates the multi-function IC card 21 so that a ticket, a pack of cigarettes, a telephone card, a drink, etc. can be purchased, more commercial transactions become cashless enabling the electronic purse system to be used as a general purpose paying method.

This invention enables completely cashless commercial transactions, because a commercial transaction is made with exchanges of the amount information written in the cashless medium 1.

Since an ATM terminal unit 2 set at a place like a bank office will only need exchange of amount information, and no longer need physical exchange of money, the ATM terminal unit 2 can be made much smaller.

Since the non-settled fund file 322 stores only the sum of the amount information written in more than one cashless medium 1, its memory capacity does not have to be large.

Since a seller will no longer have to process a cumbersome commercial transaction currently required with a credit card and, instead, will only have to process the sum of the amount information gained from more than one commercial transaction classified by the bank number, the seller can process the commercial transaction more quickly than with other settlement processings. Besides, since few tickets will be required, unlike a commercial transaction made with a credit card, paperwork will be simplified.

This card will enable total elimination of bad debt loss occurring with a credit card when a commercial transaction is executed without approval from the credit card company. Thus, the seller can accept the multi-function IC card 21 with confidence.

Therefore, this invention enables easily operable cashless transactions.

What is claimed is:

1. A point of sale terminal device connectable to a cash register carrying out a commercial transaction in an electronic cashless system by recording a commercial transaction amount onto an electronic cashless medium card and recording said amount into a tallying file within said terminal, said commercial transaction occurring without using an account number identifying an owner of the electronic cashless medium card, which comprises:

a direct clearing component providing direct clearing of the commercial transaction by communicating the commercial transaction amount to the electronic cashless medium card, the electronic cashless medium card not required to communicate an account number of the owner and having a total cash amount and a processor, said processor of the electronic cashless medium card subtracting said commercial transaction amount from said total cash amount; and an indirect clearing component providing clearing of the transaction with a central bank by communicating the tallying file to said central bank without communicating the account number of the owner.

2. An automatic transaction terminal device connectable to a cash register carrying out a commercial transaction in an electronic cashless system by recording a commercial transaction amount onto a cashless card and recording said amount into a tallying file within said terminal device, the commercial transaction occurring without using an account number identifying an owner of the cashless card, which comprises:

a transactional interface receiving an electronic cashless card wherein said commercial transaction occurs without the electronic cashless card being required to communicate the owner's identity and a transaction amount is cleared through a central clearing authority without communicating the card owner's identity.

3. A transaction terminal, comprising:

storage storing a transaction amount; and a transaction unit connected to said storage and performing a transaction for the transaction amount with an electronic cashless medium and clearing the transaction amount through a clearing authority both without exchanging an identity of an owner of the electronic cashless medium.

4. A transaction terminal, comprising:

a transaction recording unit recording a transaction amount of money; and a transaction exchange unit coupled to said recording unit and interacting with an electronic cashless medium to exchange the transaction amount with the electronic cashless medium without exchanging an identity of an owner of the electronic cashless medium and the transaction amount is cleared through a central clearing authority without communicating the identity of the owner of the cashless medium.

5. A point of sale device, comprising:

a cash register device producing a transaction amount of money; and a terminal device connected to said register device to receive the transaction amount, said terminal device including an interface couplable to an electronic cashless medium comprising a processor connected to a memory storing a balance amount of money, said terminal device interacting with said processor to change the balance amount responsive to the transaction amount without identifying an owner of the electronic cashless medium and interacting with a central clearing authority to communicate the transaction amount without identifying the owner of the electronic cashless medium.

6. A terminal as recited in claim 3, further comprising balance means for determining a balance remaining for the cashless medium responsive to the transaction and writing the balance remaining into the cashless medium.

7. A terminal as recited in claim 3, further comprising means for communicating the transaction amount to a clearance center.

8. A terminal as recited in claim 3, further comprising:

a cash register determining the transaction amount;

exchange means for exchanging the transaction amount with the cashless medium; and tally means for accumulating transaction amounts of several cashless media.

9. A terminal as recited in claim 8, wherein said tally means stores separate accumulated transaction amounts for respective banks.

10. A terminal as recited in claim 8, further comprising update means for updating the accumulated transaction amount responsive to approval of the transaction by the cashless medium holder.

11. A terminal as recited in claim 8, further comprising means for storing accumulated transaction amounts for plural banks.

12. A terminal as recited in claim 8, further comprising means for communicating the accumulated transaction amounts of said tallying means to a clearance center.

13. A terminal as recited in claim 3, wherein a holder of the cashless medium confirms ownership of the cashless medium without interacting with said terminal and said terminal interacts with the cashless medium when ownership is confirmed.

14. A terminal as recited in claim 3, wherein the cashless medium provides a bank identifier for the transaction and said terminal further comprising means for storing the bank identifier in association with the transaction amount and communicating the identifier with the transaction amount to a clearance center.

15. A terminal as recited in claim 3, wherein the cashless medium indicates whether a balance of the cashless medium is greater than the transaction amount and said terminal further comprising means for updating a tally file with the transaction amount responsive to the indication.

16. A terminal as recited in claim 3, further comprising:
   input means for inputting a money value equal to the transaction amount;
   subtracting means for subtracting the transaction amount from the cashless medium; and
   means for transmitting the transaction amount balance to a center device for updating a non-settled fund with the transaction amount.

17. A transaction terminal interacting with an electronic cashless medium and a host computer clearing authority for clearing electronic cashless transactions, said terminal comprising:
   a transaction recording unit recording a transaction amount of money; and
   a transaction exchange unit coupled to said recording unit, interacting with the electronic cashless medium to exchange the transaction amount with the electronic cashless medium without exchanging an identity of an owner of the electronic cashless medium and interacting with the host computer to clear the transaction amount without exchanging the identity of the owner of the electronic cashless medium.

* * * * *